US007634802B2

(12) United States Patent
Chiloyan

(10) Patent No.: US 7,634,802 B2
(45) Date of Patent: Dec. 15, 2009

(54) SECURE METHOD AND SYSTEM FOR CREATING A PLUG AND PLAY NETWORK

(75) Inventor: John H. Chiloyan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

(21) Appl. No.: 11/044,360

(22) Filed: Jan. 26, 2005

(65) Prior Publication Data

US 2006/0168647 A1 Jul. 27, 2006

(51) Int. Cl.
*G06F 7/04* (2006.01)
*H04L 29/06* (2006.01)
*H04L 9/32* (2006.01)
*G06F 21/00* (2006.01)
*H04M 1/66* (2006.01)
*G06F 15/177* (2006.01)
*G06F 15/173* (2006.01)
*G06F 15/16* (2006.01)

(52) U.S. Cl. ............... 726/4; 726/2; 726/21; 713/155; 713/168

(58) Field of Classification Search ......... 380/255–257, 380/266, 270–274; 455/410, 411; 709/220, 709/222, 223, 225, 227–229; 713/150–154, 713/159–168; 726/2–8, 11
See application file for complete search history.

(56) References Cited

U.S. PATENT DOCUMENTS

| | | | | |
|---|---|---|---|---|
| 6,012,102 A * | 1/2000 | Shachar | ........................ | 710/5 |
| 6,393,484 B1 * | 5/2002 | Massarani | .................. | 709/227 |
| 6,484,943 B1 * | 11/2002 | Reber et al. | ............. | 235/462.15 |
| 6,667,690 B2 * | 12/2003 | Durej et al. | ............... | 340/572.1 |
| 2001/0025272 A1 * | 9/2001 | Mori et al. | ..................... | 705/76 |
| 2002/0046175 A1 * | 4/2002 | Bleumer | ...................... | 705/51 |
| 2002/0157002 A1 * | 10/2002 | Messerges et al. | .......... | 713/155 |
| 2003/0001382 A1 * | 1/2003 | Bermudez | .................... | 283/114 |
| 2003/0149874 A1 * | 8/2003 | Balfanz et al. | .............. | 713/168 |
| 2004/0003250 A1 * | 1/2004 | Kindberg et al. | ............ | 713/171 |

FOREIGN PATENT DOCUMENTS

GB 2408128 A * 11/2003
WO WO 03/098931 A1 * 11/2003

OTHER PUBLICATIONS

Pestoni, Florian. "xCP Cluster Protocol," IBM Presentation to CPTWG, IBM Research, Jul. 18, 2002.*

* cited by examiner

*Primary Examiner*—Kimyen Vu
*Assistant Examiner*—Darren Schwartz
(74) *Attorney, Agent, or Firm*—Workman Nydegger

(57) ABSTRACT

A first device is automatically authorized to participate in a secure network by associating the first device with network access information in a machine-accessible format that can serve as a basis for the authorization. The network access information may be presented to a machine code reader in communication with a second device participating in the secure network. Upon the network access information being presented to the reader, the second device authorizes the first device associated with the identifier to participate in the secure network. Alternatively, the network access information may be registered with an authorization database in which the network access information is associated with a network identifier or an identifier representing a user associated with the secure network. The second device is signaled, by means of a signal button or comparable act, to access the authorization database to verify the first device is authorized to participate in the network.

15 Claims, 17 Drawing Sheets

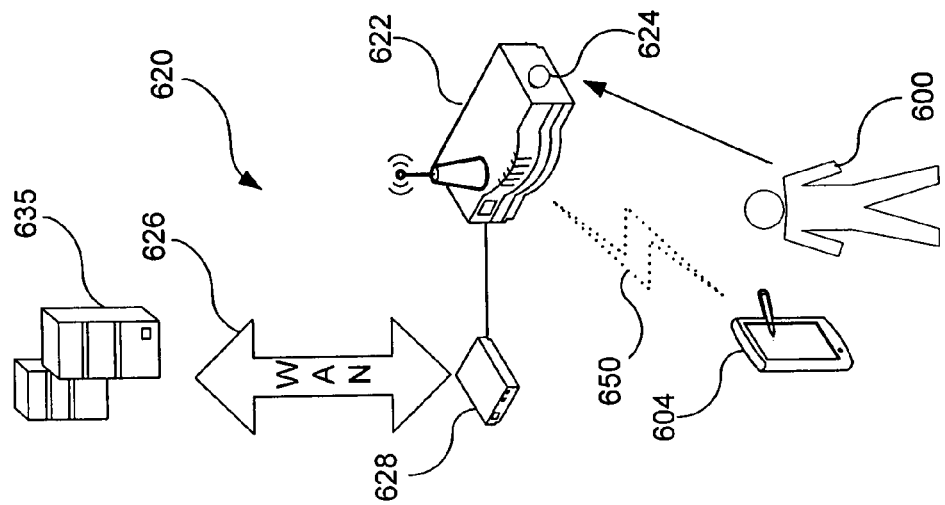
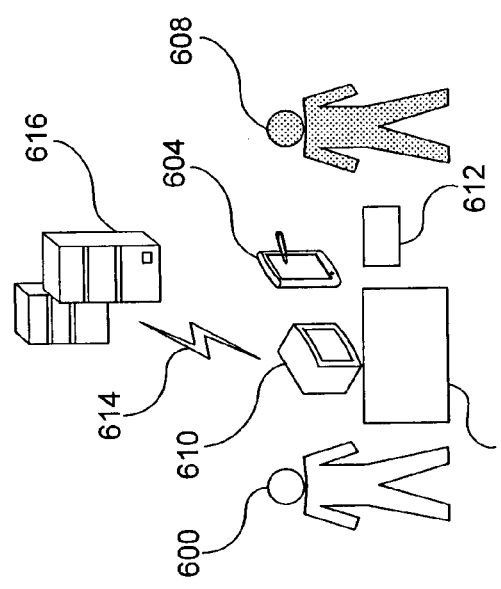
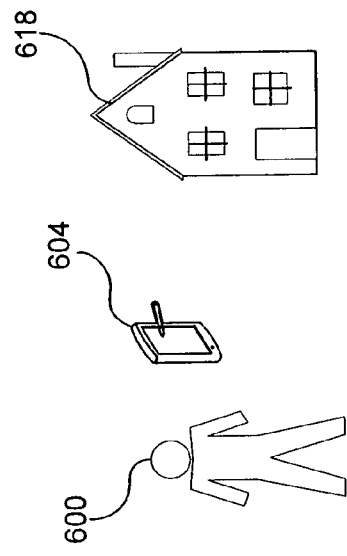
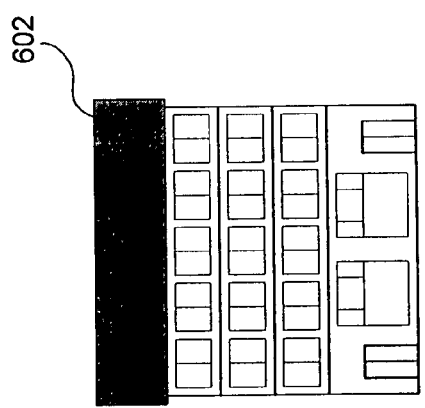
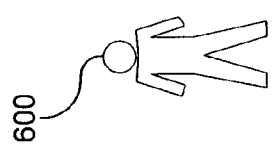
FIG. 6E
FIG. 6C
FIG. 6D
FIG. 6A
FIG. 6B

SECURE METHOD AND SYSTEM FOR CREATING A PLUG AND PLAY NETWORK

FIELD OF THE INVENTION

The present invention generally pertains to computing networks, and more specifically, to creating a secure network and automatically authorizing devices to participate in a secure network.

BACKGROUND OF THE INVENTION

Personal computers have become so popular that for many people, they are indispensable, if not an actual necessity. In most offices, a personal computer in some form can be found on every worker's desk. Moreover, it is not unusual for an average family to own multiple computers. Often, each member of a family will have their own computer, and these computers will be located in different rooms of the residence.

One of the reasons for the expanding popularity of personal computers is the Internet. Via the Internet, personal computers can be used to "surf the Web," view streaming video, purchase and download music, movies, and software, and for many other activities. Many applications of the computer that require accessing the Internet are impractical over dial-up connections; thus, high-speed digital subscriber line (DSL) and broadband digital cable Internet services are rapidly increasing in popularity. Fortunately, it is not necessary to provide a separate broadband Internet access for each personal computer in a home or business. Instead, personal computers within a business or household can share a single high-speed Internet connection through a network. However, small business and/or household wiring may not be able to support a conventional Ethernet wired network because the wiring has not been installed for such a network. Certainly, rewiring an office building or a home can be an expensive and an involved undertaking.

The increasing affordability of wireless networking solves many of these problems. Many portable personal computers now include built-in wireless networking adapters capable of communicating wirelessly according to Institute of Electrical and Electronics Engineers (IEEE) 802.11 protocols, such as the IEEE 802.11a, IEEE 802.11b, and/or IEEE 802.11g protocols. Also, computers, as well as wireless telephones, personal digital assistants, and many other devices, include Bluetooth technology to enable short-range wireless communications. For computers not already equipped with wireless networking, adapters for both desktop and portable computers are relatively inexpensive. Moreover, these devices, along with corresponding wireless access points and/or wireless routers, can be purchased inexpensively from common home electronics or computer stores, or from online sources. With wireless access points and routers, multiple computers can readily share a broadband connection, as well as share resources on other computers in the wireless network, such as storage devices and printers.

In addition to the increasing popularity and affordability of wireless networking solutions, alternative wired networking solutions are becoming simpler and more affordable. Unlike conventional Ethernet or comparable local area networks, these alternative wired networks do not require dedicated wiring. Instead, the alternative wired networks communicate over an unused frequency range over existing wiring that is not subject to unmanageable interference from other signals passing over the existing wiring. For example, broadband over powerline (BPL) networks such as Homeplug™ allow for users to network devices by coupling the devices with adapters that plug into conventional AC electrical outlets. The adapters allow the devices to communicate over AC wiring running throughout the home or office without interfering with the primary purpose of the AC wiring to supply power. Similar systems allow networking over telephone wiring or television cable or satellite coaxial wiring without interfering with the telephone, television, or other broadband traffic carried by the coaxial wiring.

Yet, installing or adding a device to a wireless network or alternative wired network has often been viewed as a difficult task. One significant problem is the difficulty in setting up or modifying a wireless network. This task may prove particularly daunting for a user who does not have extensive personal computer skills or knowledgeable friends who might provide support. Assuming a user has the sophistication to install a broadband Internet connection, or someone else is able to install it for the user, a user's computing environment might be as shown in FIG. 1A. In this example, a basic computing environment 100a includes a single personal computer 110 with a universal serial bus (USB) port or Ethernet connection 112a that is connected by a cable to a wide area network (WAN) modem 114, such as a DSL or cable modem, which provides access to a high-speed Internet provider through a WAN (Internet) connection 116. This connection enables only a single user 120 to access Internet connection 116.

As shown in FIG. 1B, a second user 130 can be enabled to also connect through WAN connection 116 with another personal computer, such as another desktop computer, a laptop computer, or as shown in FIG. 1B, a tablet computer 140. Tablet computer 140, like many portable computers sold today, includes built-in wireless networking capability. To take advantage of the wireless networking capability of tablet computer 140, a wireless router 150 is employed to create a wireless network 100b. Wireless router 150 is coupled to WAN modem 114 by a cabled connection 112b, instead of coupling WAN modem 114 directly (with a cable) to personal computer 110 through its connection 112a (FIG. 1A). To take further advantage of wireless router 150, a wireless adapter 160 is employed to enable personal computer 110 to be relocated to another room or to a different position within the same room, where it might be inconvenient to run a cable from personal computer 110 to wireless router 150.

Ideally, personal computer 110 and tablet computer 140 would simply be turned on, and their wireless adapters would automatically establish wireless communication links 162 and 142, respectively, with wireless router 150. However, the process of establishing wireless communications between personal computer 110 and tablet computer 140 with wireless router 150 is more complex than that.

As shown in FIG. 1C, to implement many wireless networks or to add another device to a wireless network, at least one computer, such as personal computer 110, must be temporarily joined to wireless router 150 in network 100c, using a cabled connection 170. In some cases, connecting cabled connection 170 from personal computer 110 to wireless router 150 may be very inconvenient, depending on how difficult it is to access USB or Ethernet ports on personal computer 110 and wireless router 150. For example, these ports are typically on the back of both devices, and the devices may be located in positions remote from one another.

Alternatively, some wireless networks allow a new device to be added to a wireless network, but the individual adding the device to the network must know the name or service set identifier (SSID) of the wireless network, network security type and network key. Finding this information, accessing the appropriate interface for adding a device, and properly providing this information may be daunting for a user, as described below. Moreover, a number of device manufacturers use the same default network security type and network key for a number of their access point models, thus, a hacker with some familiarity with networking devices may have little trouble circumventing the security system of such an access point.

Even after the initial connection is made with a physical cable or a wireless connection, potentially greater difficulties remain. As shown in FIGS. 2A-2C, it may still be necessary to manually configure the wireless router and wireless network. In most cases, as shown in FIG. 2A, the router is configured using a web browser application 200 for entering a seemingly cryptic network address 202 into the address field 204 of web browser application 200, so that it can access the configuration software of the router. Entering the correct network address 202 will usually requires a close reading of the router documentation and careful entry of the value, once found. The network address commonly used might be 192.168.2.1, but sometimes, manufacturers use different default subnet addresses, and for businesses, the subnet might be set to an entirely different address range than the initial default. As shown in FIG. 2B, if network address 202 is entered in address field 204 correctly, a pop-up window 206 is presented soliciting a user name 208 and password 210, which must be entered to proceed with setup. Although the initial user name and password typically are reasonably simple defaults, such as "ADMIN" for both the initial user name and password, it will be important for the user to read through the router documentation and correctly enter into user name 208 and password 210 in the requested fields.

Furthermore, once the numeric address, user name, and password have all been correctly entered, as shown in FIG. 2C, the user must then configure the router and network on one or more screens, such as a setup screen 250. Setup screen 250 includes areas for entering or selecting parameters for both wired LAN connections 260 and wireless connections 280. Parameters to be entered or selected for wired LAN connections 260 include a media access control (MAC) address 262, a configuration type 264, an IP address 266, a subnet mask 268, and a gateway address 270. Parameters to be entered or selected for wireless connections 280 include a MAC address 282, a mode 284, a SSID 286, and a channel 288. Setup screen 250 may be encountered not only when the network is being installed, but also if it is necessary to add new devices to the network.

For wireless connections 280, options for wireless security include an enable 290 and a disable 292 check boxes. For many wired networking topologies, control of network access (although not necessarily all network resources) is controlled by controlling access to network ports. In other words, if the network ports all are inside a home or office to which access is controlled, presumably access to the network also is controlled. On the other hand, additional security schemes are needed for wireless schemes because such physical access control is not practical. Unless adequate wireless network security is employed, occupants of neighboring residences or offices may be able to usurp network resources, such as a broadband Internet access, or worse, access proprietary information stored within the network.

Although wireless network security is available, it is one more facet of the network a user may have to configure, and the additional steps for configuring wireless security increase the likelihood for confusion, mistakes, and frustration experienced by the user. In fact, some users may opt to disable (or at least not enable) wireless security for the sake of convenience, risking the security of network resources and information. Alternatively, some users may decide that implementation of a wireless network is too complicated and forego the entire effort.

It would therefore be desirable to provide a simple method for setting up and controlling wireless network access without the technical complications inherent in currently available methods for setting up and controlling wireless network security. In particular, it would be desirable to generally prevent devices presenting nominal security credentials from accessing the network unless those devices are determined to be eligible for provisional access, and to provide provisional access in a simple manner that does not present the complications inherent in presently used wireless security systems.

SUMMARY OF THE INVENTION

One of the advantages of the present invention is that it facilitates enabling security in a wireless network while providing a simplified process for authorizing newly introduced devices to participate in the wireless network. Embodiments of the present invention alleviate the inconvenience that can arise when skilled users are asked to assist in manually authorizing new users to join the wireless network; moreover, embodiments of the present invention avoid the need for less skilled users to suffer the rigors of having to learn details required to configure a router to accept new devices. Embodiments of the present invention enable new devices to be authorized to participate in the wireless network merely by signaling a controller participating in the wireless network that a new device is ready to be authorized. In connection with the present invention, wireless networks may include (without limitation) radio frequency (RF) networks such as the various IEEE 802.11 networks, or powerline networks, such as HomePlug™.

One embodiment of the present invention involves associating machine-readable codes with devices that are to be added to the network, and associating machine code readers with a controller in the wireless network. Presenting a machine-readable code to the machine code reader signals the controller that the device is eligible to participate in the network. Because access to the machine code reader can be controlled by conventional security, such as a space accessible only through locked doors, only authorized personnel can present a device to the machine code reader for authorization. In another embodiment of the present invention, when a supplier provides a new device to a user of a wireless network, the provider causes an entry to be made in an authorization database. The entry is associated with a person authorized to use the wireless network, or with the wireless network itself. When the user is ready to use the device on the network, the user signals to the controller that the device is ready for use. The controller then accesses the authorization database to make sure that the device has been authorized to participate in the network or has been associated with a user authorized to participate in the network. If so, the device is authorized to use the network. A combination of measures may be employed. For example, a user may present a machine-readable code to the machine code reader, causing the controller to verify that the authorization database includes an entry associating the machine-readable code with the network or an authorized user of the network. Authorization provided may be provisional in nature, thus allowing a user provisional access to a wireless network for sufficient time to enable the user to establish a non-provisional access to the network.

One aspect of the present invention is thus directed to a method for authorizing a first device to participate in a secure network in which network access information in a machine-accessible format is associated with the first device. The first device is then disposed to be able to participate in the secure network upon the first device receiving authorization to participate in the secure network. A second device is signaled to examine the network access information associated with the first device. The first device is then allowed to participate in the secure network when the second device determines that the authorization should be provided, based on the network access information.

Authorization may be determined not to exist (or to have ceased to exist) if the second device determines that a provisional authorization interval allowing the first device to provisionally participate in the secure network has expired. Alternatively, authorization may be determined not to exist when there is a failure to determine that the network access information is authorized for participation in the secure network. Authorization may be determined not to exist if a network administrator has revoked the authorization associated with the network access information, or if some other non-provisional authorization has otherwise been established for the first device to participate in the secure network.

The secure network may include a wireless network, such as an IEEE 802.11 network, a Bluetooth network, or another type of wireless network, such that the first device is disposed to be able to participate in the secure network when the first device is within a communication range of a second device participating in the secure network. The secure network also may comprise a powerline network, such that the first device is disposed to be able to participate in the secure network when the first device is coupled with electrical power wiring to which the second device is also coupled. The secure network also may comprise a telephone wiring network, such that the first device is disposed so that it will be able to participate in the secure network when the first device is operably coupled with telephone wiring to which the second device is also operably coupled, whereby the first device is configured to communicate with the second device over the telephone wiring while the telephone wiring conveys regular telephone communications. In addition, the secure network may include a coaxial wiring network, such that the first device is disposed so that it will be able to participate in the secure network when the first device is operably coupled with coaxial wiring to which the second device is also operably coupled, whereby the first device is configured to communicate with the second device over the coaxial wiring while the coaxial wiring conveys one of regular television and regular wide area network communications. The network also may include a wired network, such that the first device is disposed to be able to participate in the secure network when the first device is coupled to the secure network via a network cable.

The network access information includes a media access control (MAC) address, security mode and/or a security key. The network access information may be presented in a machine-readable form, such as a radio frequency identification tag, an optically readable code, a smart card, a short-range passive transmitter, or a short-range active transmitter. Alternatively, the network access information may be authorized to participate in the secure network by associating the network access information in an authorization database with a network identifier associated with the secure network, or with a user identifier associated with a user who is authorized to access the secure network. The first device accesses the authorization database upon being signaled to examine the network access information associated with the first device, and allows the first device to participate in the secure network upon verifying the network access information is associated with the network identifier that is associated with the secure network, or with the user identifier associated with a user who is authorized to access the secure network. The user identifier may include an identifier that represents the user and which is made available to the provider. The user identifier may optionally include a credit card number, a debit card number, a bank account number, a Social Security number, an e-mail address associated with the user, or a driver's license number. The second device is signaled to perform the authorization by activation of an authorization key associated with the second device, transmission of an authorization command from an additional device in communication with the second device, or resetting of the second device.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 6A-6E illustrate steps used to authorize a device to communicate in a wireless computing network where the controller accesses an authorization database according to another embodiment of the present invention;

Figure 10:
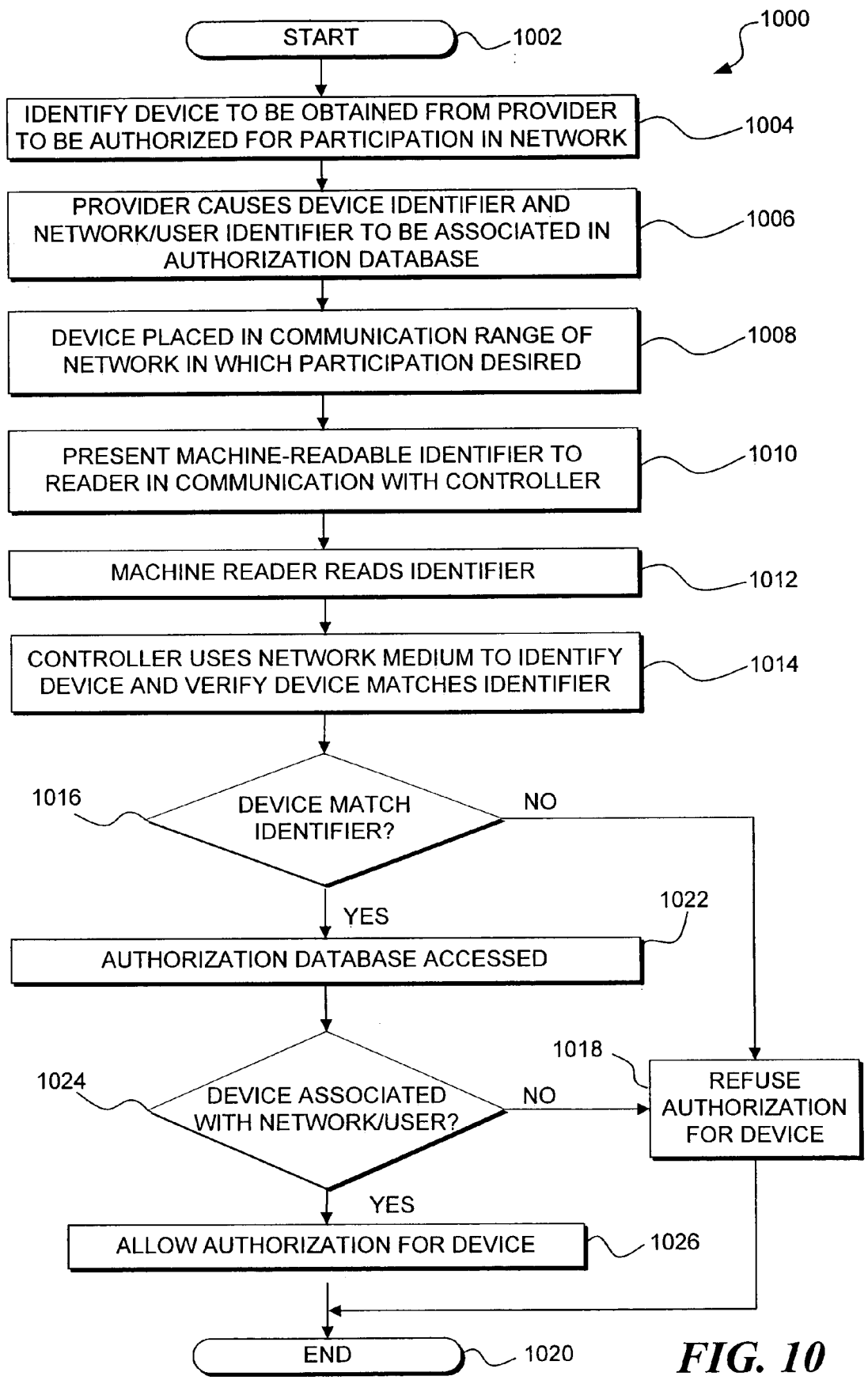
Figure 11:
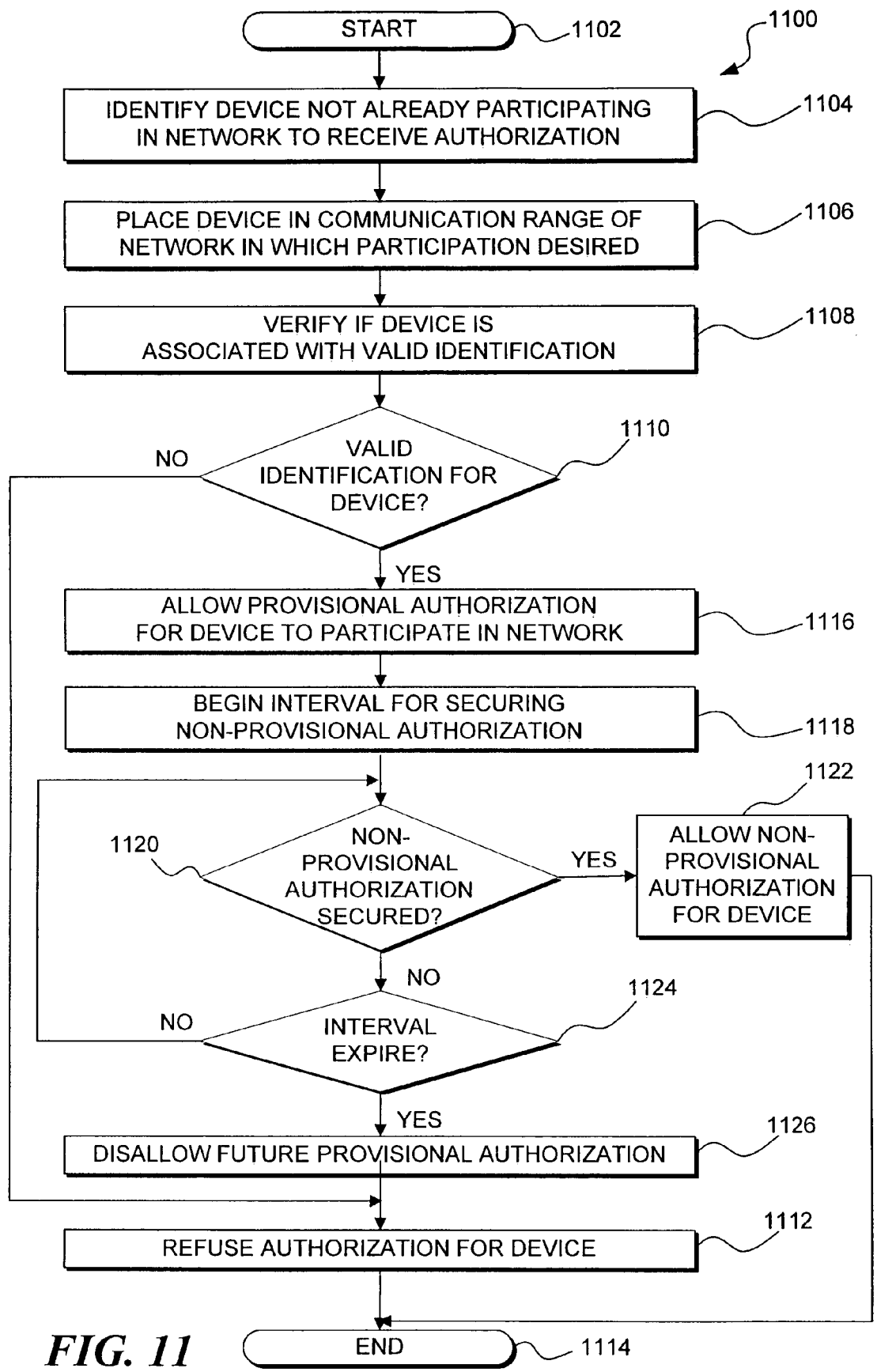

FIG. 10 is a flow diagram illustrating the logical steps for authorizing a device to participate in a wireless network where the device is associated with a machine-readable identifier presentable to a machine code reader that is coupled with a controller, and where the device is pre-authorized in an authorization database that is accessible by the controller in the wireless network; and FIG. 11 is a flow diagram illustration the logical steps for authorizing a device to participate provisionally and non-provisionally in a wireless network if the device is associated with a valid identifier, and if non-provisional authorization is granted within a pre-determined interval.

DESCRIPTION OF THE PREFERRED EMBODIMENT

Exemplary Computing System for Implementing Present Invention

Figure 3:
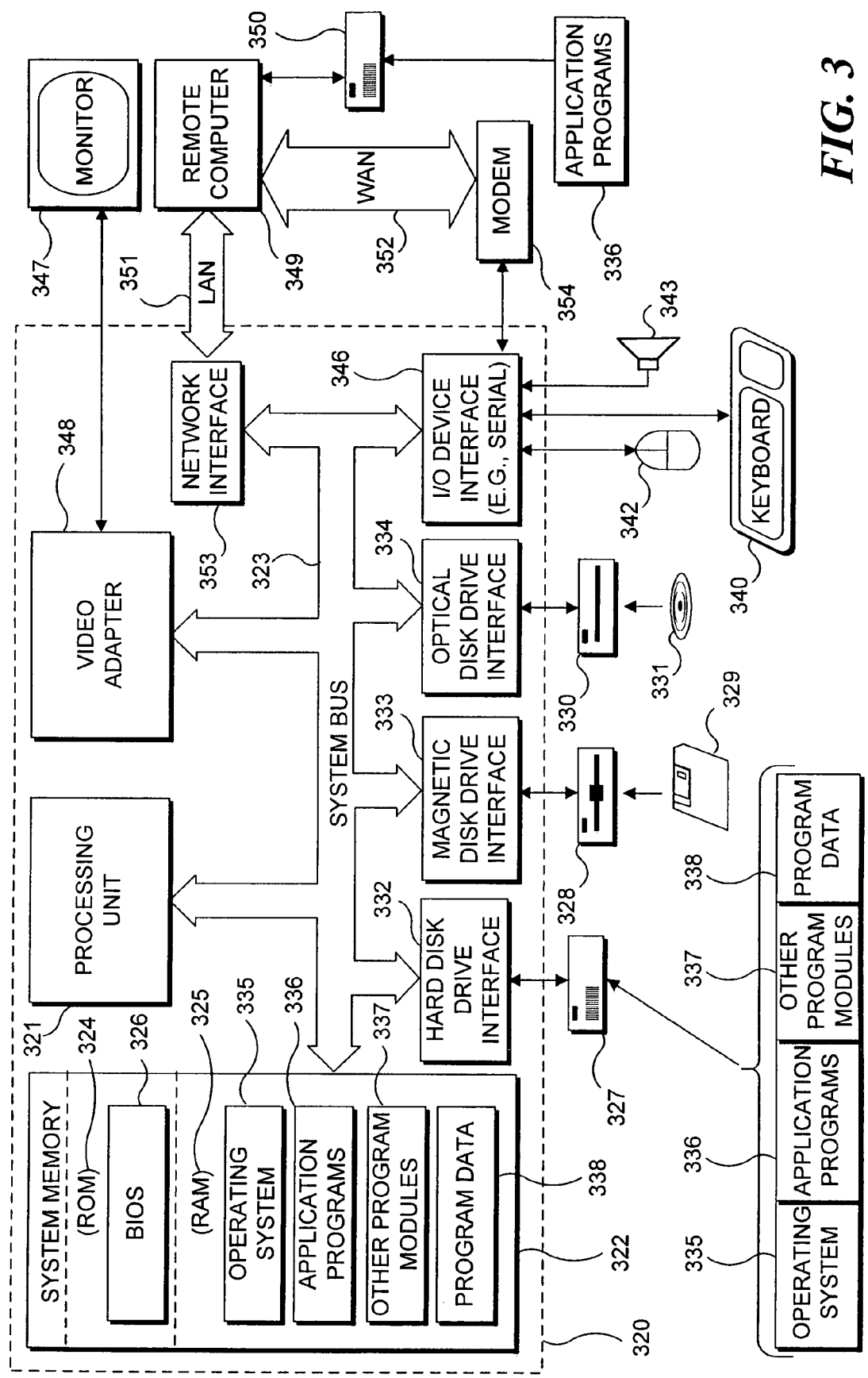
FIG. 3 is a functional block diagram of a generally conventional computing device or personal computer (PC) that is suitable for use in controlling or accessing a wireless computer network, in accord with the present invention.

With reference to FIG. 3, an exemplary conventional PC suitable for use in practicing the present invention is shown. The exemplary PC is representative of the types of computing devices that are usable in a network employing an embodiment of the present invention. Similarly, a variation of such a computing device, which would likely not include input/output devices and supporting components other than those used for networking, represents a type of computing device that is usable as a controller in an embodiment of the present invention.

The system includes a general purpose computing device in the form of a PC 320, provided with a processing unit 321, a system memory 322, and a system bus 323. The system bus couples various system components including the system memory to processing unit 321 and may be any of several types of bus structures, including a memory bus or memory controller, a peripheral bus, and a local bus using any of a variety of bus architectures. The system memory includes a read only memory (ROM) 324 and a random access memory (RAM) 325. A basic input/output system 326 (BIOS), containing the basic routines that help to transfer information between elements within PC 320, such as during start up, is stored in ROM 324. PC 320 further includes a hard disk drive 327 for reading from and writing to a hard disk (not shown), a magnetic disk drive 328 for reading from or writing to a removable magnetic disk 329, and an optical disk drive 330 for reading from or writing to a removable optical disk 331, such as a compact disk-read only memory (CD-ROM) or other optical media. Hard disk drive 327, magnetic disk drive 328, and optical disk drive 330 are connected to system bus 323 by a hard disk drive interface 332, a magnetic disk drive interface 333, and an optical disk drive interface 334, respectively. The drives and their associated computer readable media provide nonvolatile storage of computer readable machine instructions, data structures, program modules, and other data for PC 320. Although the exemplary environment described herein employs a hard disk, removable magnetic disk 329, and removable optical disk 331, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 329, optical disk 331, ROM 324, or RAM 325, including an operating system 335, one or more application programs 336, other program modules 337, and program data 338. A user may enter commands and information in PC 320 and provide control input through input devices, such as a keyboard 340 and a pointing device 342 that communicate with system bus 323 via I/O device interface 346. Pointing device 342 may include a mouse, stylus, wireless remote control, or other pointer. As used hereinafter, the term "mouse" is intended to encompass virtually any pointing device that is useful for controlling the position of a cursor on the screen. One or more audio input/output device 343, including headsets, speakers, and microphones, also engage personal computer 320 via I/O device interface 346. Still further input devices (not shown) may include a joystick, haptic joystick, yoke, foot pedals, game pad, satellite dish, scanner, or the like. These and other input/output (I/O) devices are often connected to processing unit 321 through an I/O interface 346 that is coupled to system bus 323. The term I/O interface is intended to encompass each interface specifically used for a serial port, a parallel port, a game port, a keyboard port, and/or a universal serial bus (USB). A monitor 347 is connected to system bus 323 via an appropriate interface, such as a video adapter 348. It will be appreciated that PCs are often coupled to other peripheral output devices (not shown), such as speakers (through a sound card or other audio interface—not shown) and printers.

PC 320 can also operate in a networked environment using logical connections to one or more remote computers, such as a remote computer 349. Remote computer 349 may be another PC, a server (which is typically generally configured much like PC 320), a router, a network PC, a peer device, or a satellite or other common network node, and typically includes many or all of the elements described above in connection with PC 320, although only an external memory storage device 350 has been illustrated in FIG. 3. The logical connections depicted in FIG. 3 include a local area network (LAN) 351 and a wide area network (WAN) 352. Such networking environments are common in offices, enterprise wide computer networks, intranets, and the Internet.

When used in a LAN networking environment, PC 320 is connected to LAN 351 through a network interface or adapter 353. When used in a WAN networking environment, PC 320 typically includes a modem 354, or other means such as a cable modem, Digital Subscriber Line (DSL) interface, or an Integrated Service Digital Network (ISDN) interface for establishing communications over WAN 352, such as the Internet. In embodiments of the present invention, network interface 353 suitably includes a wired network adapter, such as an Ethernet adapter, and/or a wireless network adapter, such as an IEEE 802.11 type communications adapter. Modem 354, which may be internal or external, is connected to the system bus 323 or coupled to the bus via I/O device interface 346, i.e., through a serial port. In a networked environment, program modules, or portions thereof, used by PC 320 may be stored in the remote memory storage device. It will be appreciated that the network connections shown are exemplary and other means of establishing a communications link between the computers may be used, such as wireless communication and wide band network links.

Figure 4A:
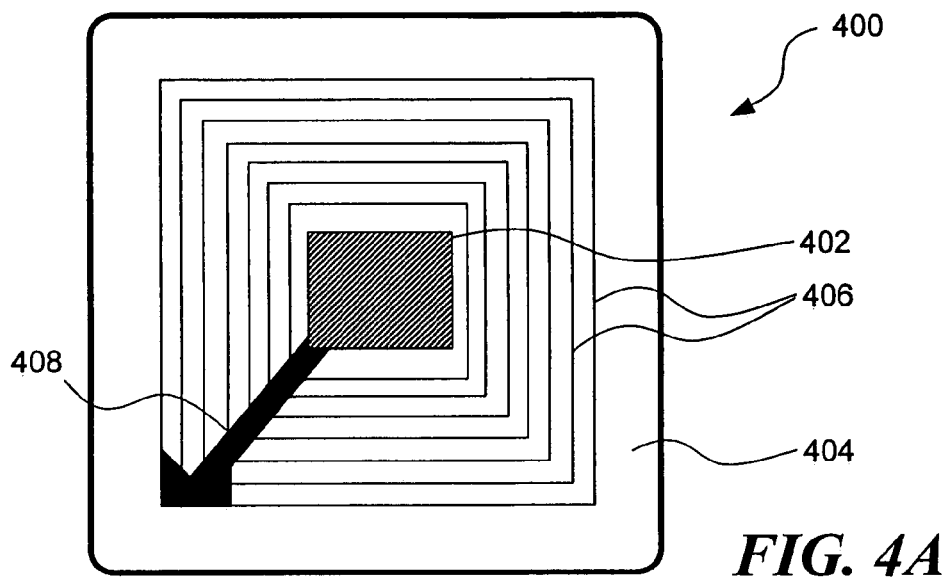
FIGS. 4A-4C illustrate machine-readable identifiers usable with embodiments of the present invention.
Figure 4B:
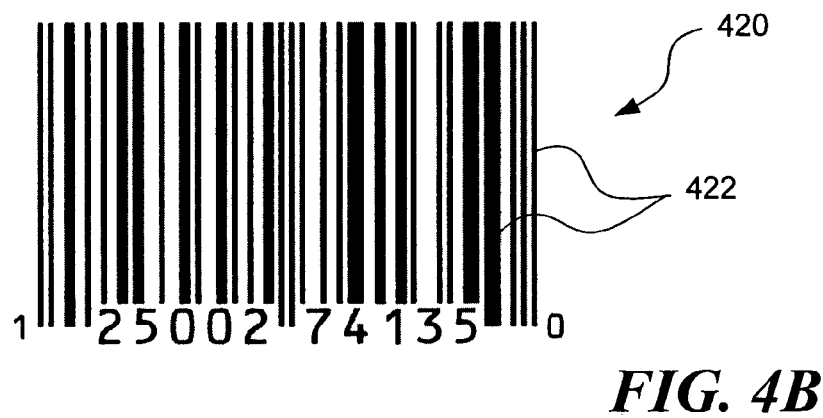
Figure 4C:
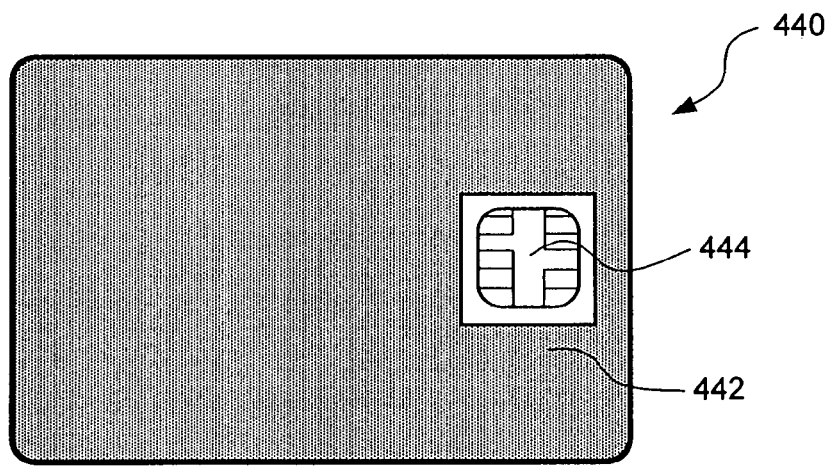

Network Access Information Presented in Machine-Accessible Format Usable with Embodiments of the Present Invention FIGS. 4A-4C illustrate three of the many forms of machine-accessible formats of the network access information that may be used with embodiments of the present invention, including a radio frequency identification (RFID) tag 400, an optically readable bar code 420, and a smart card 440. As described below, in various embodiments of the present invention, the machine-accessible formats of the network access information are associated with devices that are desired to be added to a network, and the identifier is used to authenticate that the device should be permitted to participate in the network.

The network access information may, for example, include a media access control (MAC) address for the network to which access is sought. Alternatively, the network access information may include a security mode and/or a security key. For example, the security mode may include wireless equivalency protocol (WEP) information and a security key, or WiFi protocol access (WPA) information and a security key. Embodiments of the present invention may be used with a number of different security protocols to control access to a secure network.

FIG. 4A illustrates an exemplary inductively coupled RFID tag 400. The RFID tag includes a microchip 402, which is mounted on a substrate 404. The substrate typically includes a thin, flexible, and sometimes adhesive material that enables the RFID tag to be adhesively secured to a package, inserted in the pages of a book, and similarly inconspicuously associated with objects. Microchip 402 is inductively powered by coils of metal 406 that are deposited on substrate 402 and typically arrayed around microchip 402 on RFID tag 400. An RFID reader (not shown) generates a magnetic field received through coils of metal 406, causing an electrical current to flow within metal coils 406. The current is conveyed through a conductor 408 to microchip 402, powering microchip 402. Upon being powered, microchip 402 communicates identifying codes or other information to the RFID tag reader.

FIG. 4B illustrates an exemplary bar code 420. Bar codes 420, which are often used on merchandise to identify the merchandise and associate the merchandise with a price, are well known and includes a sequence of bars 422 of various width that represent different alphanumeric characters quickly readable by an optical scanner. Other well known optically scannable codes that might be used are two-dimensional and are thus able to convey more information per area than a linear bar code.

FIG. 4C illustrates a smart card 440. Smart card 440 includes a base 442 on which, typically, is disposed a credit-card-sized plastic substrate. Mounted on base 442 is a microprocessor (not shown) covered by a conductive contact pad 444. Contact pad 444 includes a plurality of individual electrical contacts configured to be engaged by a card reader. Contact pad 444 provides power contacts that allow a reader (not shown) to provide power to the microprocessor, as well as signal contacts that can be used to read and/or write information to and from smart card 440.

It should be noted that there are a limitless number of other machine-accessible formats of network access information that may be used with embodiments of the present invention. For example, instead of the inductive RFID tag 400, a capacitively-coupled RFID tag powered by an electric field generated by a reader may be used. Further, various other forms of optically-readable codes, including gray-scale codes, may be used. Various other passive or active, short-range transmitters also may be used in accordance with embodiments of the present invention.

Machine-Readable Identifiers Presented to Authorize Devices on a Network

Figure 5A:
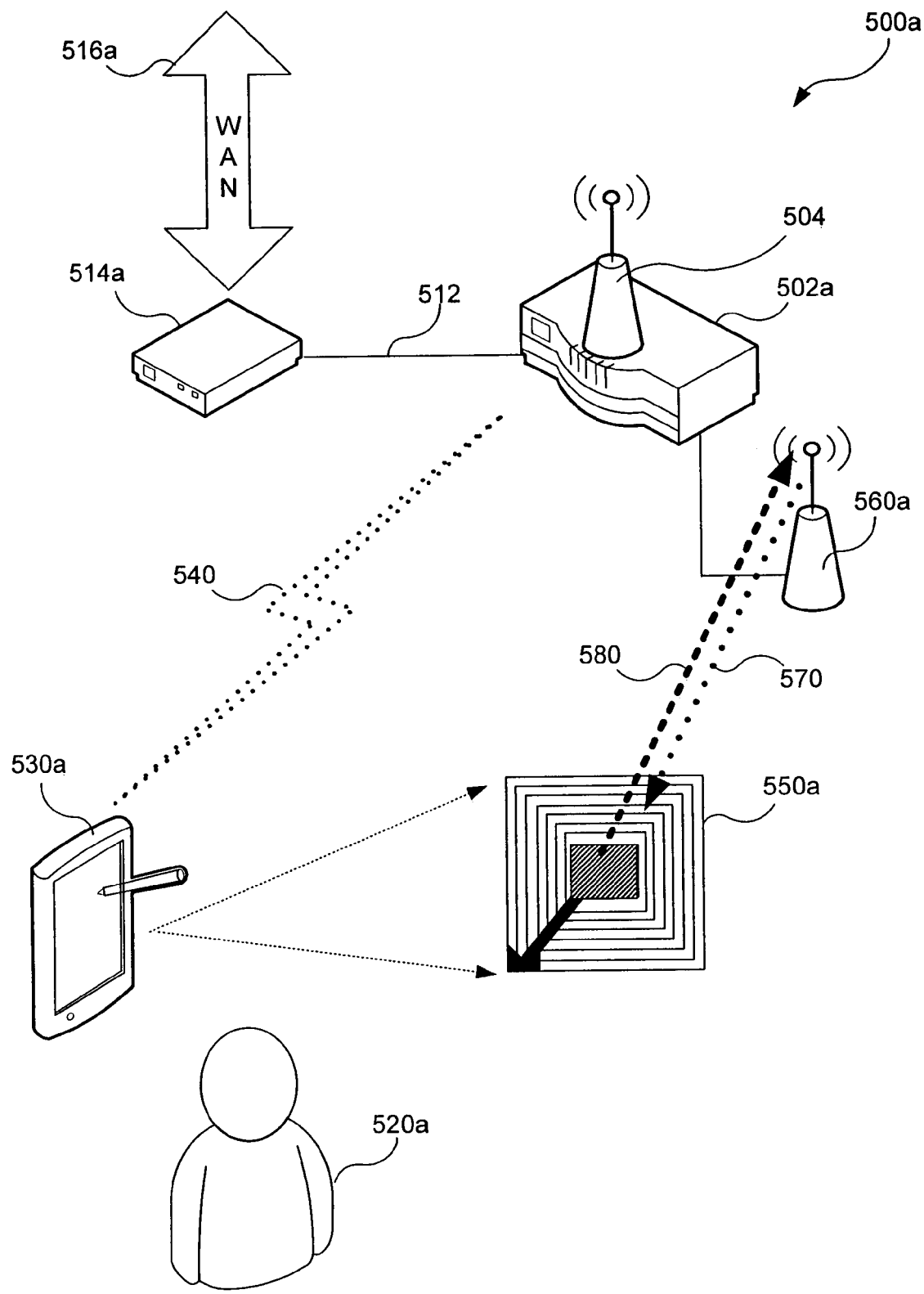
FIGS. 5A-5C illustrate how machine-readable identifiers associated with the devices are presented to machine code readers associated with a network controller to authorize devices to communicate in a wireless computing network according to embodiments of the present invention.
Figure 5B:
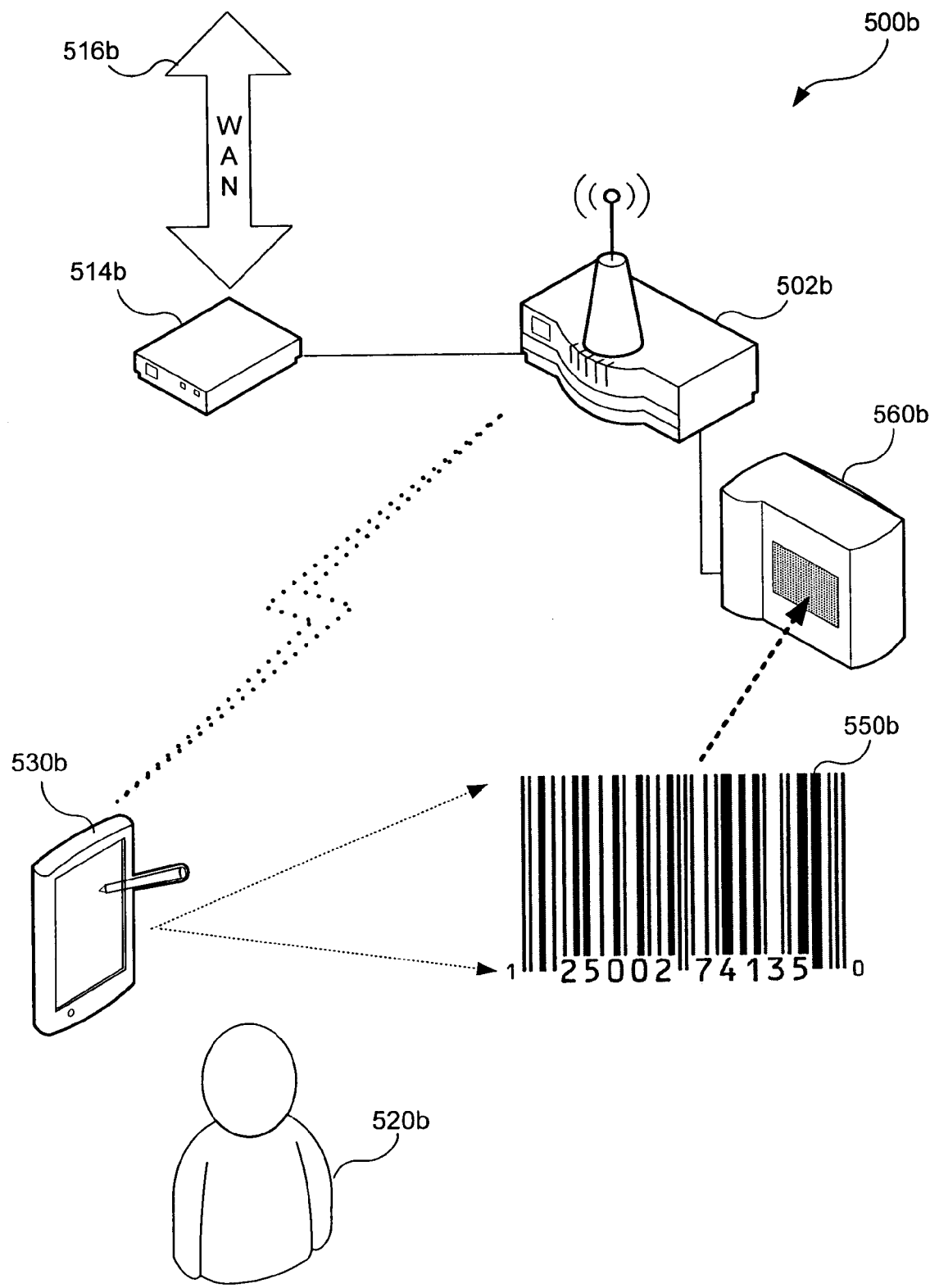
Figure 5C:
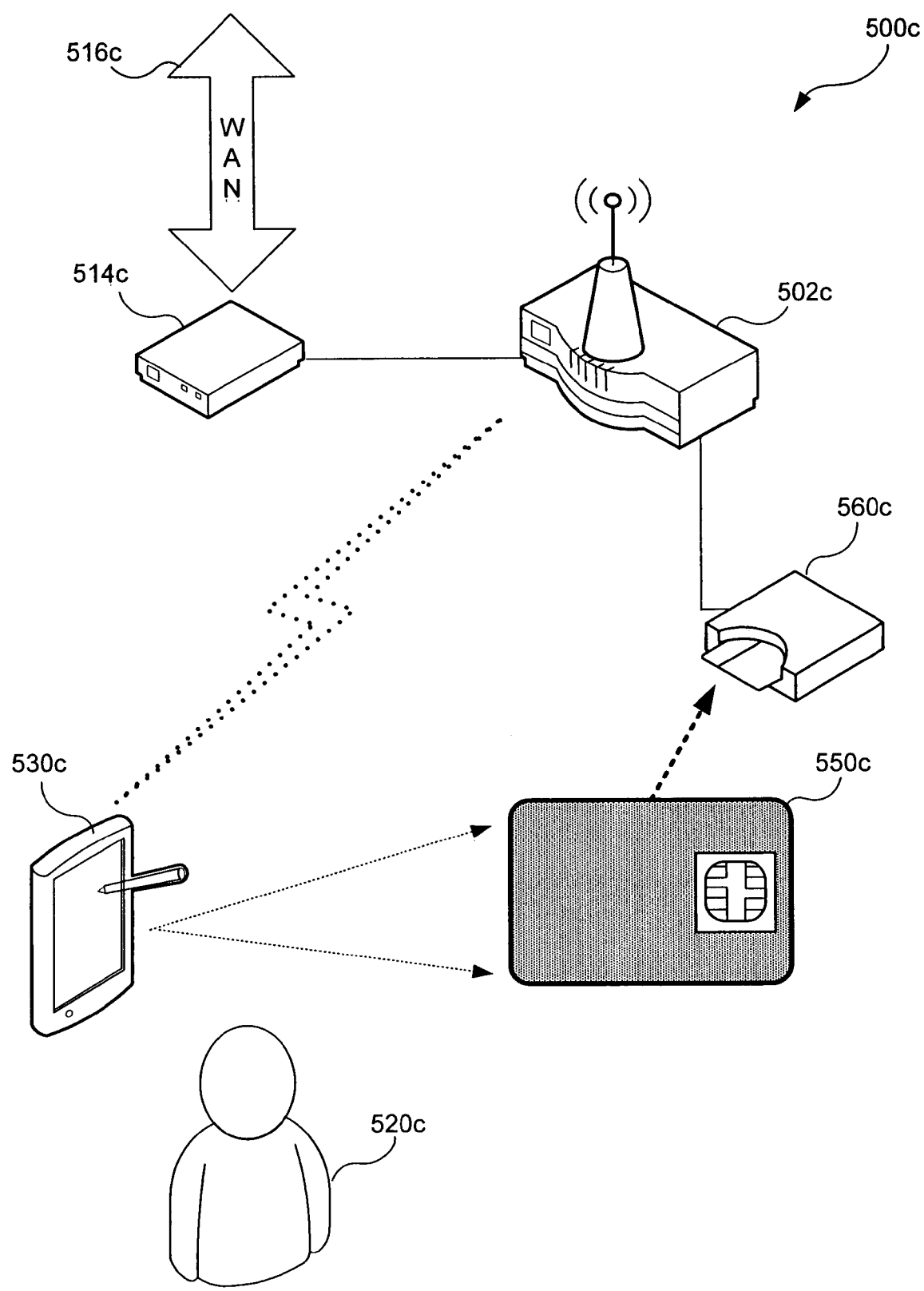

FIGS. 5A-5C illustrate embodiments of the present invention in which a machine-readable identifier associated with a device is used to obtain authorization for the device to participate in the network. In the following illustrations, it should be noted that RF-type wireless networks IEEE 802.11-type networks are depicted, but embodiments of the present invention are also usable with Bluetooth, powerline, and other wired and/or other wireless networks. A Bluetooth network provides for short-range wireless communications between classes of devices using spread-spectrum technology. A powerline network, such as a HomePlug™ network, is functionally similar to a wireless network except that it uses the alternating current (AC) line wiring of a home or office as a transmission medium. Also, although many wired networks, such as Ethernet networks, enable participation in the network (although not necessarily all resources associated with the network) based on having access to a network cable, wired network topologies providing for selective media access control also may employ embodiments of the present invention to control authorization of devices to participate in the network. Other forms of wired networks also may be used with embodiments of the present invention. As previously described, other networking systems permit networking over telephone wiring or television cable or satellite coaxial wiring without interfering with the telephone, television, or other broadband traffic carried by the coaxial wiring.

As noted above, networks can operate with or without security. Many home wireless network are not set up to use security because the user who installed the network did not want to invest the effort in doing so, or because the data stored on home computers is believed by the user to be of little interest to others, or because the transmission/reception range of the wireless router is likely to provide only very limited access to others outside the home. As a result, any device having a compatible wireless network adapter automatically can participate in the household network once the device has recognized the network and performed necessary handshaking to establish communication. On the other hand, for example, wireless Internet access at commercial "hotspots" in coffee houses and bookstores often use security so that vendors can limit access to the network to their patrons who have paid for the service. Businesses using wireless networks understandably employ security to protect proprietary information that may be accessed via the network.

In the foregoing examples, it is assumed that the networks all employ security. Thus, without some process by which a device is able to access an authorization interface where the user must correctly supply a network name, network security type and network security key provided by an administrator, it will not be very easy to add a new device to the network. Because this process is cumbersome and, to many, perceived as confusing or difficult, most users will want to avoid this process. Embodiments of the present invention allow this difficulty to be avoided.

Figure 1A:
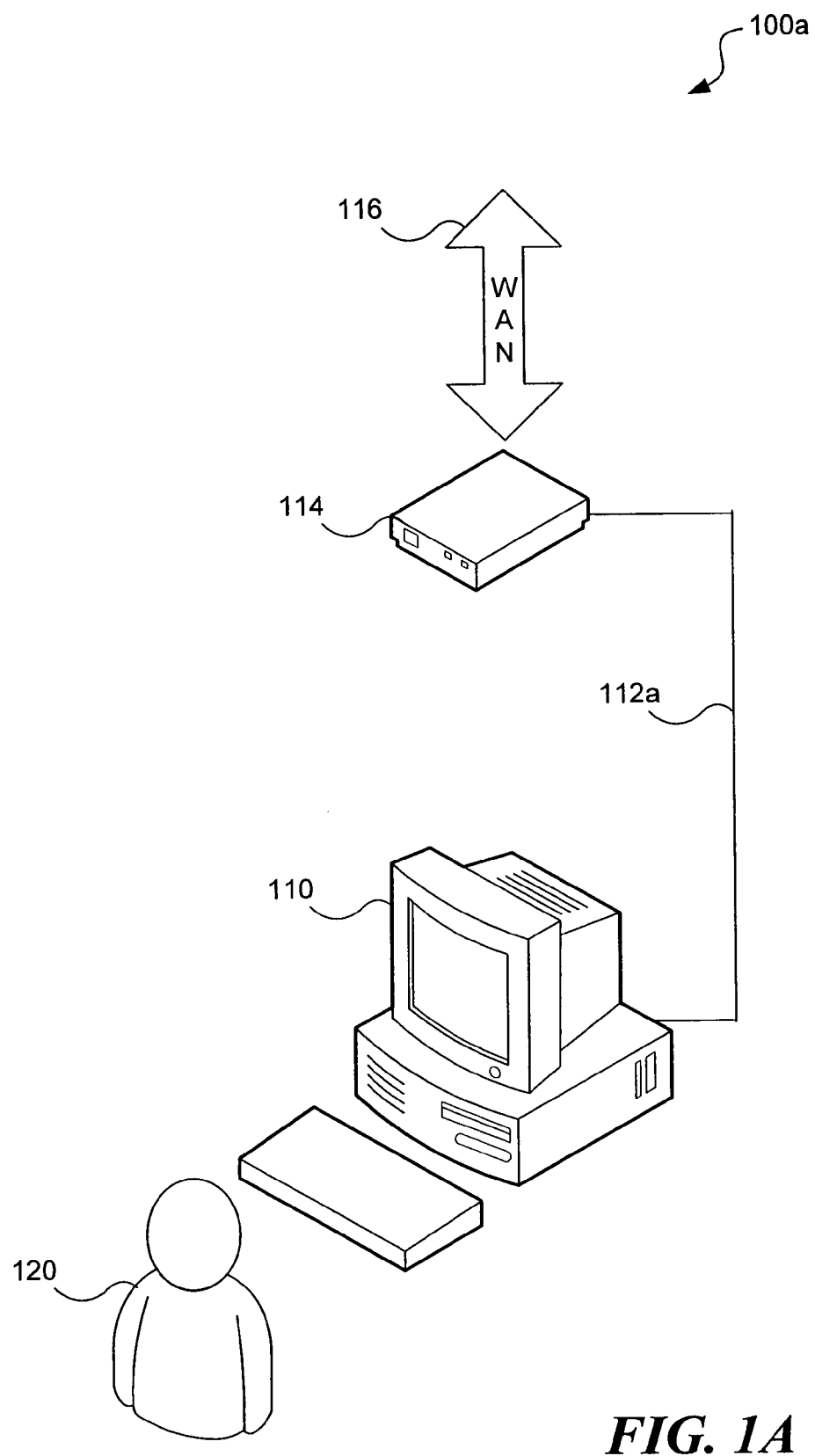
FIGS. 1A-1C (Prior Art) are schematic diagrams representing the steps that users might encounter in attempting to establish or join a wireless computer network.
Figure 1B:
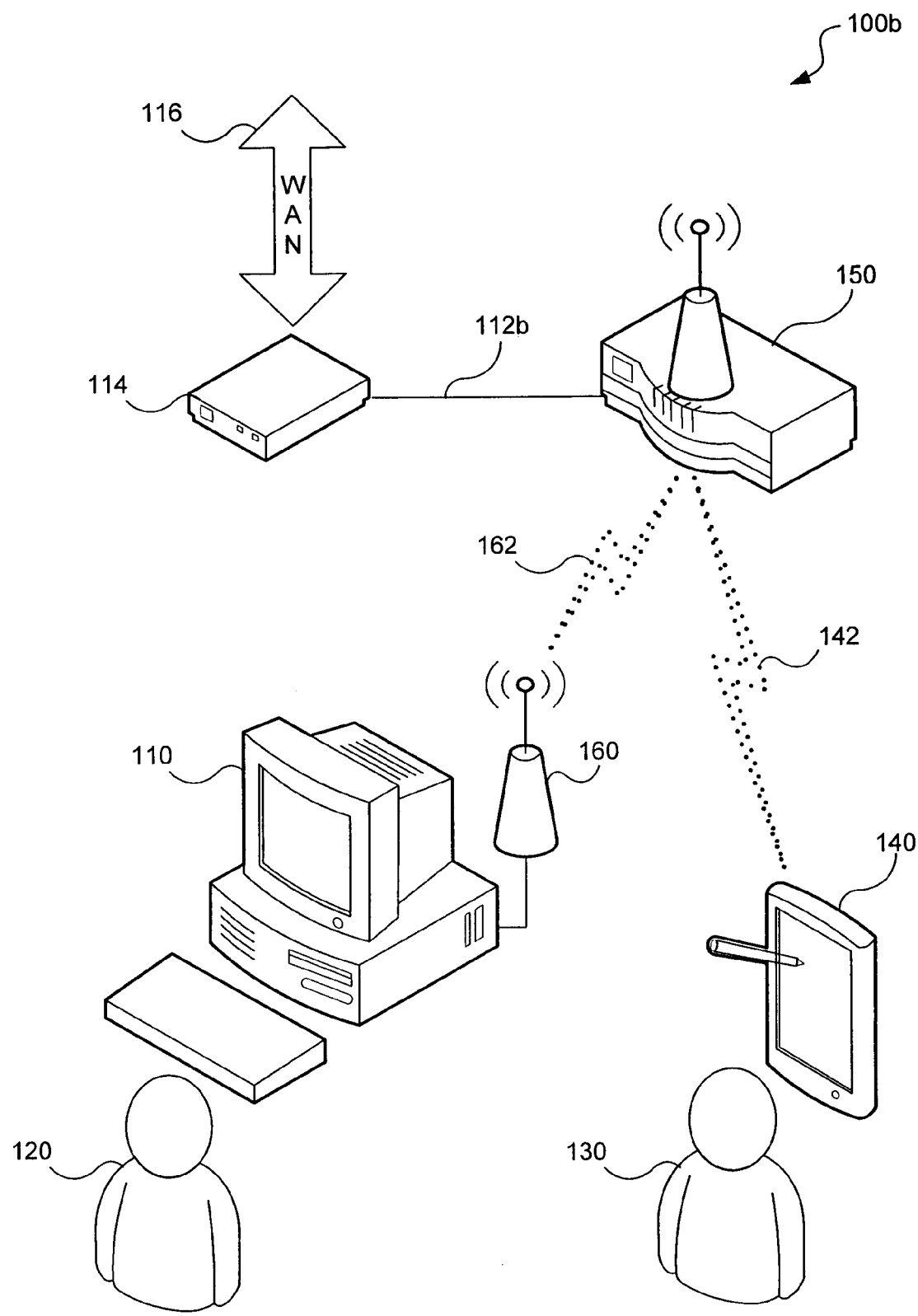
Figure 1C:
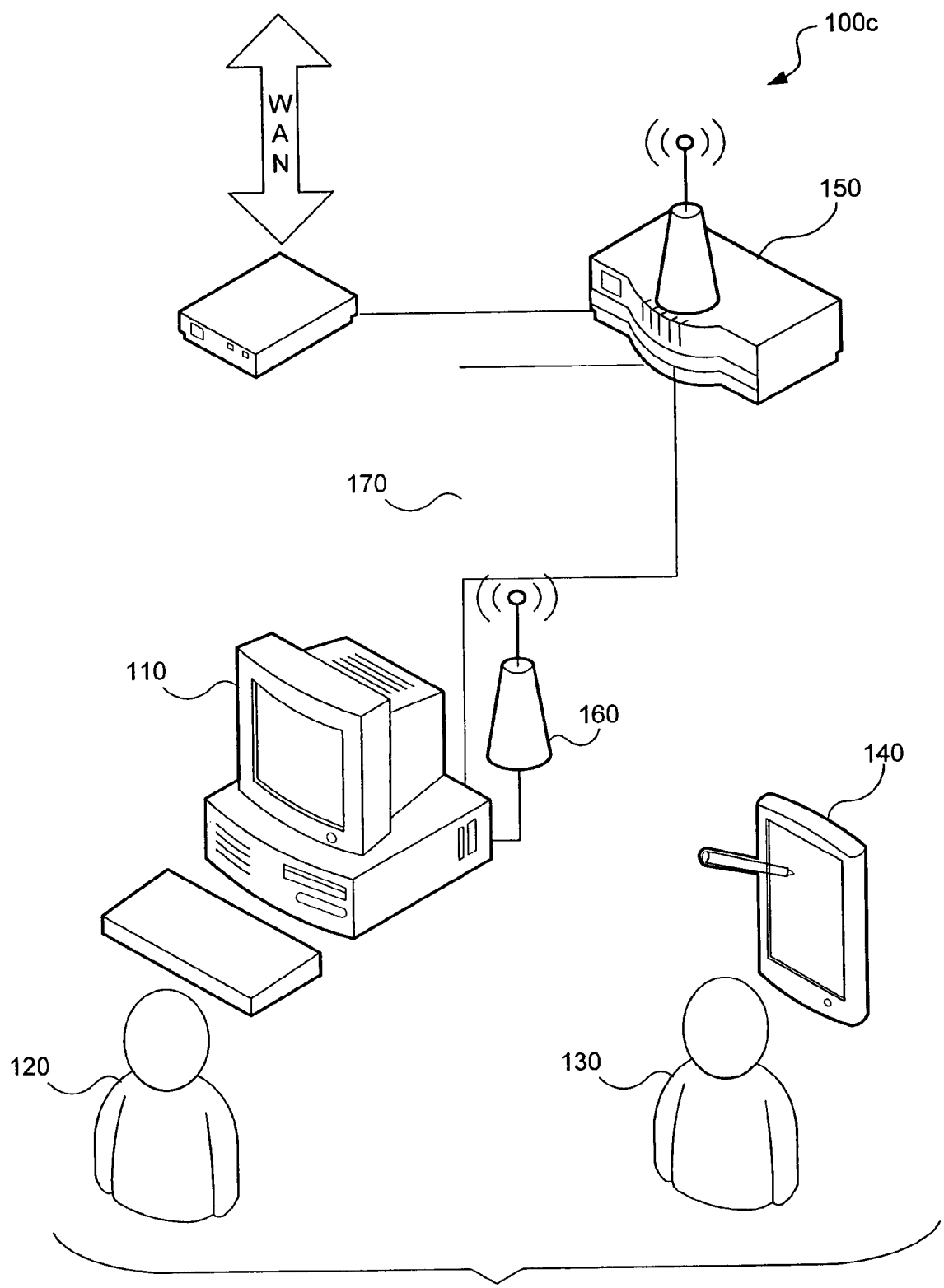
Figure 2A:
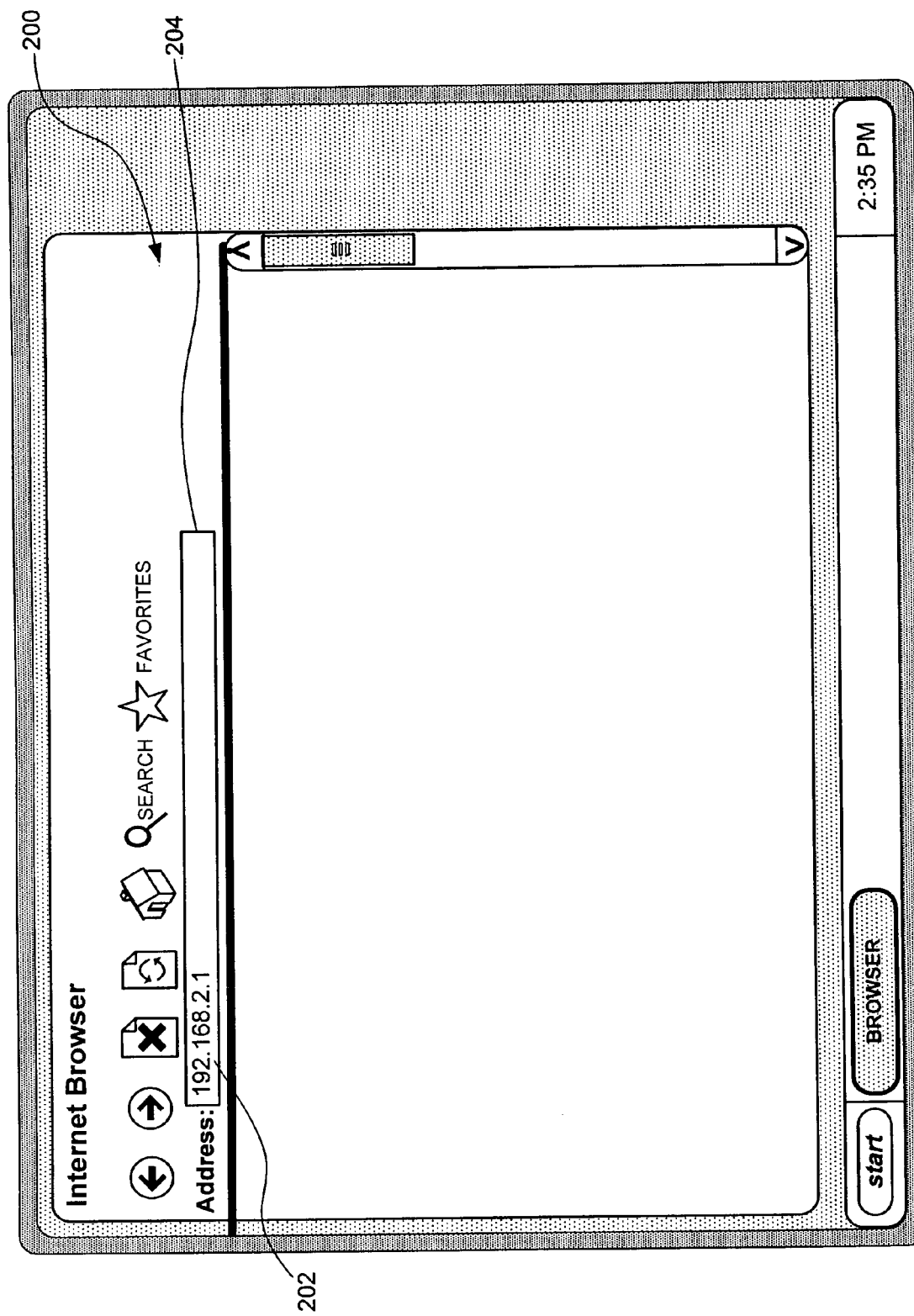
FIGS. 2A-2C (Prior Art) are router setup screens typically encountered by a user or administrator who is attempting to install a wireless local area network router.
Figure 2B:
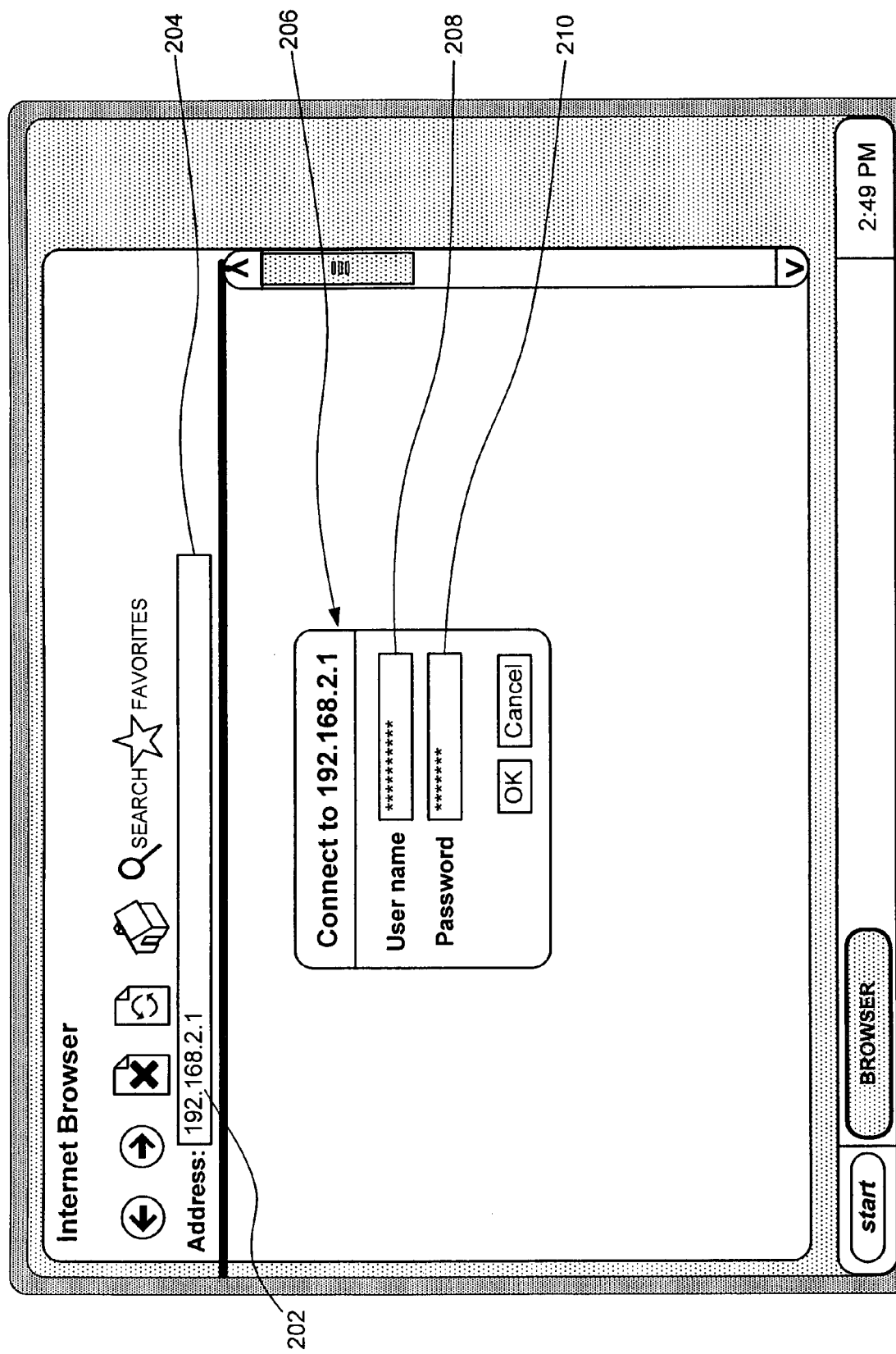
Figure 2C:
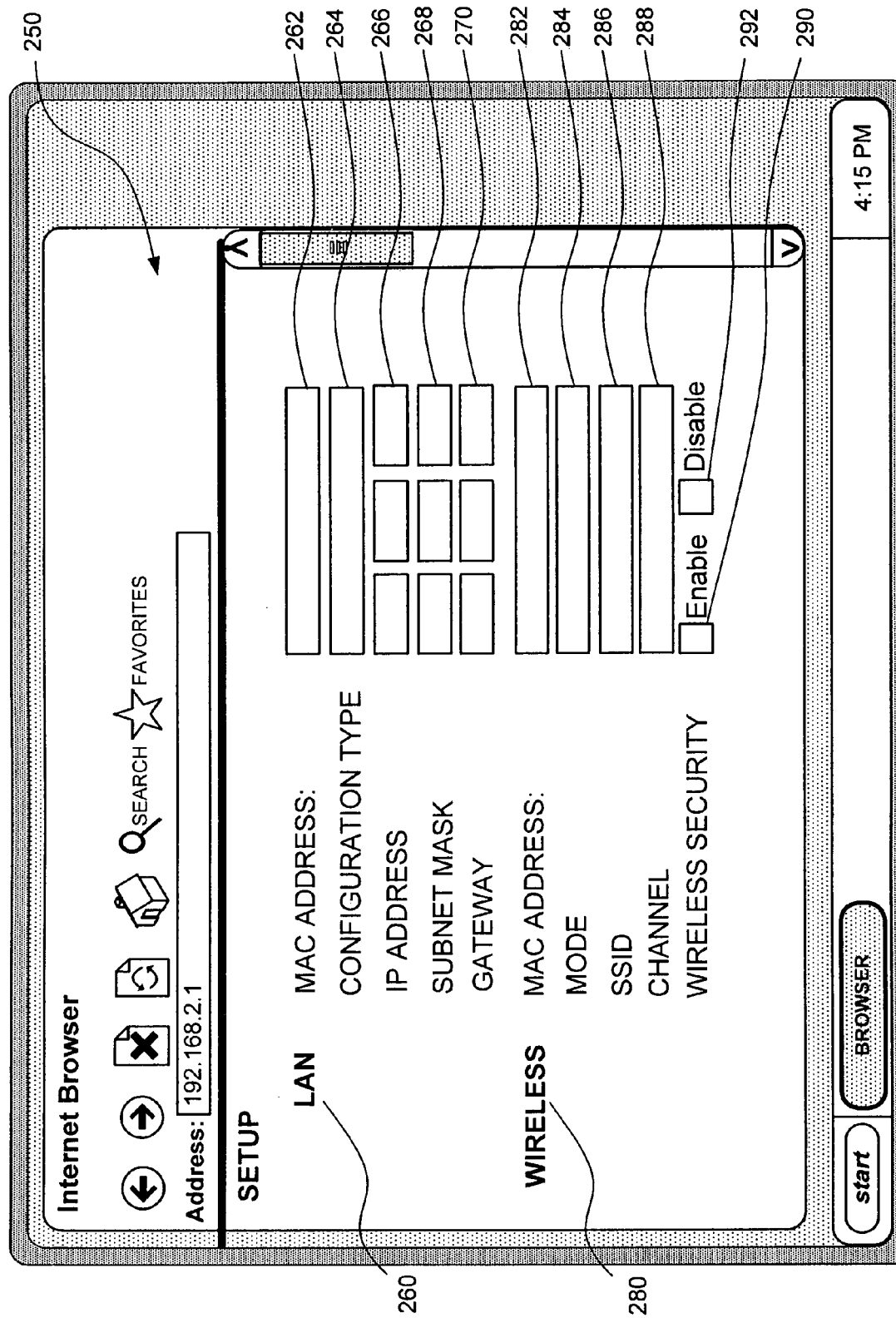

In FIG. 5A, wireless network 500a includes a controller, which in this case, is a router 502a incorporating a wireless access point 504 configured to wirelessly communicate with one or more network stations using a wireless topology, such as an IEEE 802.11 standard. As in the example of a conventional network 100b (FIG. 1B) that was described above, router 502a is connected by a cabled connection 512 to a WAN modem 514, which provides access to a WAN 516, such as a broadband Internet connection. Wireless network 500a uses security so that only authorized devices can participate in wireless network 500a. Thus, if one were to activate a device having a wireless communications adapter within the communication range of wireless access point 504, the device and router 502a may detect one another, but the device will not be permitted to participate in wireless network 500a until and unless the device is affirmatively authorized to do so.

User 520a wishes to obtain authorization to participate in network 500a for a new device 530a, which happens to be illustrated as comprising a tablet computer, but could alternatively be a desktop computer, a laptop computer, a hand-held computer, a network-capable peripheral, such as a printer or storage device, or some other network-capable device. More specifically, user 520a wishes to obtain authorization for device 530a to communicate over a wireless link 540 with router.

According to an embodiment of the present invention, network access information 550a, presented in a machine-accessible format, is associated with device 530, while router 502a is associated with machine code reader 560a. More particularly, network access information 550a is an RFID tag, as previously described in connection with FIG. 4A. It is assumed that access to router 502a and, thus, machine code reader 560a is controlled, with router 502a and machine code reader 560a being secured within an office, a secured portion of an office, or a home, such that only a person presumptively having authority to participate in network 500a can physically access the router. To obtain authorization for device 530a to participate in network 500, user 520a brings device 530a within communication range of access point 504, and then user 520a presents network access information 550a to machine code reader 560a. In network 500a, as previously described, if network access information 550a is an inductively-coupled RFID tag, a magnetic field represented by dotted line 570 generated by machine code reader 560a causes current to flow in RFID tag network access information 550a. The current enables RFID tag network access information 550a to send a transmission represented by dashed line 580 to machine code reader 560a that communicates identifying information about device 530a to machine code reader 560a. Network access information 550a may be attached to device 530a, attached to packaging in which device 530a was purchased, included with documentation for device 530a, or otherwise associated with device 530a. Machine code reader 560a may be integral to router 502b, or be a detachable peripheral device receivable by router 502b. Using wireless link 540, router 502a establishes communication with device 530a via access point 504, and upon verifying that device 530a is the device represented by network access information 550a, device 530a is given authorization to participate in wireless network 500a.

The authorization sought may be provisional, enabling user 520a to establish communications in order to be able to use device 530a to obtain non-provisional authorization through other means. As a result, the provisional authorization afforded by the recognition that device 530a is associated with machine-readable identifier 550a may be limited in time, providing user 520a only a predetermined interval in which to establish non-provisional authorization. If this interval lapses without non-provisional authorization being established, router 502a may refuse to provide any further authorization to device 530a, even if network access information 550a should once again be presented to machine code reader 560a. In such a case, user 520a would have to seek alternative authorization for further participation in the network another way, or arrange for the provisional time period to be reset, e.g., by having an authorized party make the request.

In one embodiment of the present invention, network access information 550a is singularly associated with device 530a such that presentation of network access information 550a will only provide a basis for authorization of device 530a. As a result, authorization of device 530a depends on having network access information 550a that was created specifically for device 530a. Alternatively, network access information 550a may be associated with a class of devices, such as all tablet computers, or all computers distributed by a particular device provider. As a further alternative, machine-readable identifier 550a may include a "master key" provided to a system administrator or other trusted person that enables that person to authorize any new devices.

FIGS. 5B and 5C illustrate how other types of machine-readable network access information are used to obtain authorization to participate in networks. In FIG. 5B, user 520b obtains authorization for device 530b to participate in network 500b by presenting network access information 550b in the form of an optically scannable bar code, to a machine code reader 560b, which happens to be a bar code scanner and which is in communication with router 502b. Just as was true of network access information 550a (FIG. 5A), machine-readable identifier 550b may be attached to device 530b, attached to packaging in which device 530b was purchased, included with documentation for device 530b, or otherwise associated with device 530b. In FIG. 5C, user 520c obtains authorization for device 530c to participate in network 500c by inserting network access information 550c, in the form of a smart card, into machine code reader 560c, which comprises a smartcard reader in communication with router 502c. As in the example of network 500a, machine code readers 560b and 560c may be integral to routers 502b and 502c, respectively, or be detachable peripheral devices that can be coupled with the routers. Once devices 530b and 530c have received authorization to participate in networks 500b and 500c, respectively, devices 530b and 530c can access WAN connection 516b and 516c via WAN modem 514b and 514c, respectively, as well as other network resources.

Devices Authorized by Registration with an Authorization Database

An object of the present invention is to simplify the process by which a user obtains authorization for a device to participate in a network. Thus, in addition to using network access information in the form of machine-readable codes, the process of authorization may similarly be simplified by a device provider creating an association for a device in an authorization database accessible by a controller in the user's network. Without having to manually configure access or key in verifying information, a user can obtain authorization for the device to participate in a particular network by placing the device proximate to the network and directing the network to access the authorization database.

The method used by a device provider to create such an association is illustrated in FIGS. 6A through 6E. FIG. 6A illustrates a user 600 entering a provider facility 602 where the user can select and acquire a device. It will be understood that provider facility 602 need not be at a store or supply depot that the user actually has to visit. Instead, the provider facility could be an e-commerce organization, a direct sales company, a mail-order warehouse, or any other type of supplier from which user 60 might acquire a device. In FIG. 6B, user 602 selects a device 604 to be used with a network that user 600 wants to use.

FIG. 6C shows user 600 acquiring device 604. In a physical facility 602 (FIG. 6A), user 600 might acquire device 604 by taking device 604 to a checkout counter 670 where an attendant 608 would assist user 600 in completing the acquisition. It should be noted that, if device 604 is acquired in an e-commerce transaction or similar dealing, attendant 608 may be largely replaced by a program computer system managing the transaction. In any case, as part of the process, attendant 608 would enter a network access information representing device 604 into a computing system 610. In addition, identification 612 is presented to attendant 608 by user 600. Identification 612 may include personal identification, such as a credit card, an ID card, a driver's license, or similar identification, or an identifier associated with a particular network with which device 600 will be used. The user may also present an e-mail address associated with the user verifiable that can be verified by those providing device 604. Attendant 608 enters information from identification 612 into computing system 610 to associate it with the network access information that is associated with device 604. The association between the network access information of device 604 and identification 612 is transmitted over a network 614 to a server 616 that supports an authentication database, which later will be accessed to enable device 604 to participate in a network associated with user 600.

FIG. 6D shows user 600, after acquisition of device 604a, taking device 604 to a network location 618, which may be a home, office, or other location. As shown in FIG. 6E, after arriving at network location 620 and removing device 604 from any packing, the user obtains authorization for device 604 to participate in network 620. To obtain authorization, user 600 readies device 604 for use and places device 604 in a position where it can communicate with network 620. If network 620 is a wireless network, device 604 is powered on and placed within communications range of a router or other controller 622. Alternatively, if network 620 is a powerline network, a powerline network adapter or other input/output interface on device 604 is coupled to the network and connected with the power system of network location 620 to which controller 622 is also connected. As a further alternative, if network 620 is a wired network, a network interface, such as a network cable, is coupled to device 604.

Once device 604 is ready to be used, the user signals controller 622 to examine the network access information associated with the device to initiate authorization of device 604. In the embodiment of FIG. 6E, the user signals controller 622 to permit authorization by activating an authorization key 624 on controller 622. It will be appreciated that instead of using authorization switch 624, controller 622 might be directed to permit authorization by sending an authorization command from another device in communication with controller 622, or by resetting or rebooting controller 622 causing the controller to invoke instructions resulting in initiating the authorization process. Upon receiving the authorization signal, controller 622 accesses WAN 626 via a communication link using a WAN modem 628 or similar interface. WAN 626 may include a dial-up connection to a server 635, an Internet connection to server 635, or some other form of WAN connection. It should be appreciated that server 635, which is accessed by router 622, need not be the same physical device with which device 604 was registered, but may include another server connected to access the authorization database. Upon receiving a communication from controller 622 indicating that authorization of a device is sought, authorization database on server 635 is searched for new devices associated with network 620 or an indication that user 600 is permitted to participate in network 620. Upon detecting in authorization database that there is an entry made for network 620 or user 600 of network 620, using network medium 650, controller 622 seeks to establish communication with device 604 to verify it is the device associated with network 620 or with user 600 in connection with the network. Upon verifying that device 604 previously was associated with network 620 or the user for network 620, authorization is granted for device 604 to participate in network 620.

As described above, authorization granted according to an embodiment of the present invention may be provisional, enabling a user to participate in network 620 for a limited time, so that user 600 may arrange non-provisional authorization for the device to access network 620. In one embodiments of the present invention, the provisional authorization period may include a predetermined interval from the time the signal is made by activating authorization switch 624 or otherwise sending an authorization command to controller 622. Further, activating authorization switch 624 or otherwise sending an authorization command may have to be conducted within a certain period of time from when device 604 is acquired and associated with user 600, or with network 620, as shown in FIG. 6C.

Figure 7:
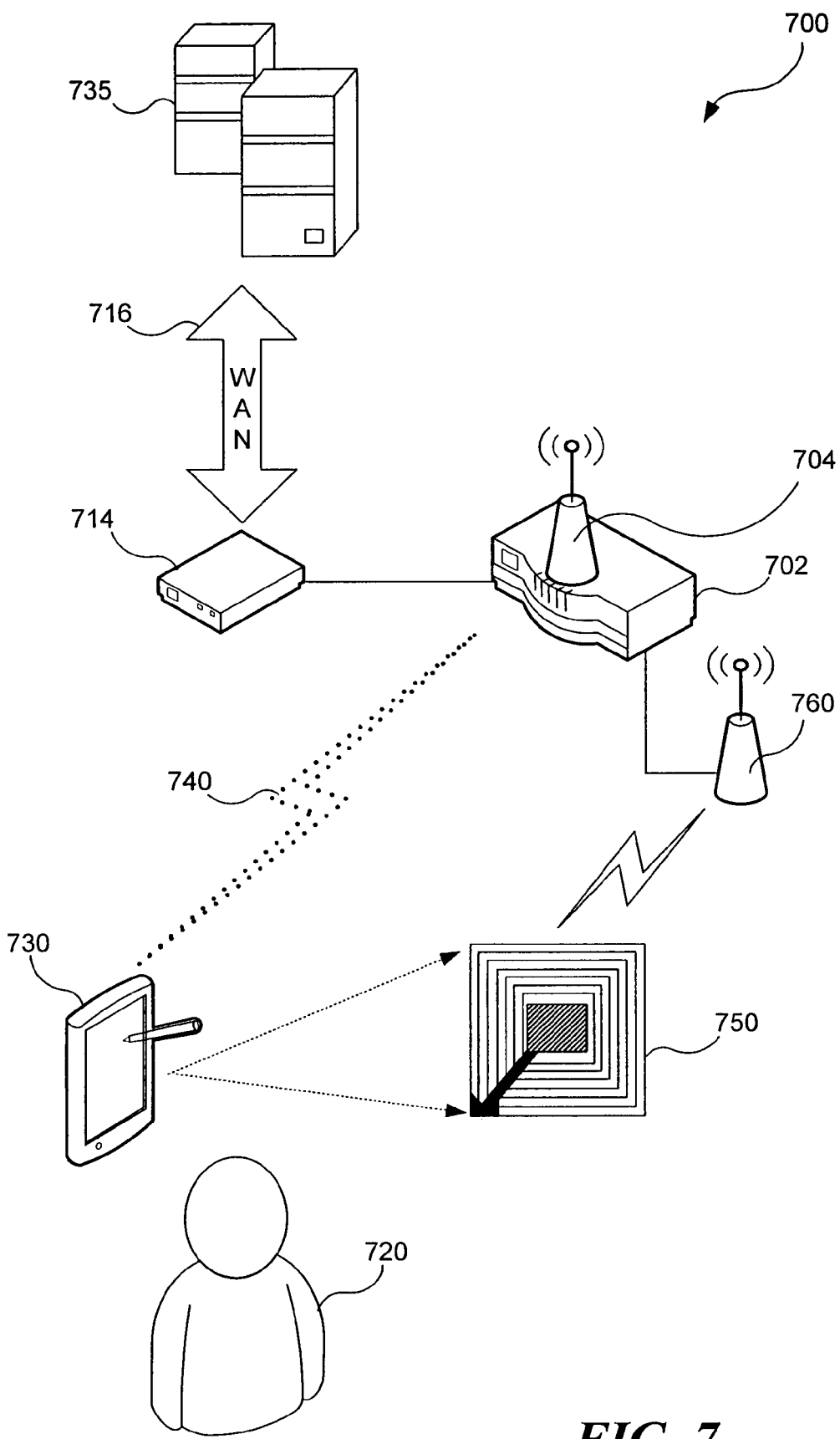
FIG. 7 illustrates how a combination of a machine-readable identifier and an authorization database are used to authorize a device to communicate in a wireless network according to another embodiment of the present invention.

Devices Authorized by Machine-Accessible Network Access Information and Authorization Database FIG. 7 shows a network 700 in which a device 730 is authorized using an embodiment of the present invention that combines features of the embodiments described in connection with FIGS. 5A through 5C, and FIGS. 6A through 6E. In the embodiment of the invention shown in FIG. 7, device 730 is authorized both by verifying that network access information in a machine-accessible format representing device 730 is presented, and by verifying that device 730 is associated in an authorization database with network 700 or with an authorized user of network 700.

More specifically, as shown in FIG. 7, to initiate obtaining network authorization for device 730, a user 720 presents network access information 750, encoded in a machine-accessible format, to a machine code reader 760. Machine code reader 760 is in communication with a controller 702. Using an access point 704 to access a wireless medium 740, controller 702 attempts to verify that device 730 is the device represented by network access information 750. If device 730 is not represented by machine-readable identifier 750, authorization to participate in network 700 is refused.

On the other hand, if controller 702 is able to verify that network access information 750 represents device 730, controller 702 then accesses WAN 716 via WAN modem 714 to access an authorization database on server 735. If authorization database on server 735 includes an entry associating device 730 with network 700 or with authorized user 720, authorization for device 730 to participate in network 700 is granted.

Logical Steps for Authorizing a Device Using a Machine-Readable Identifier

Figure 8:
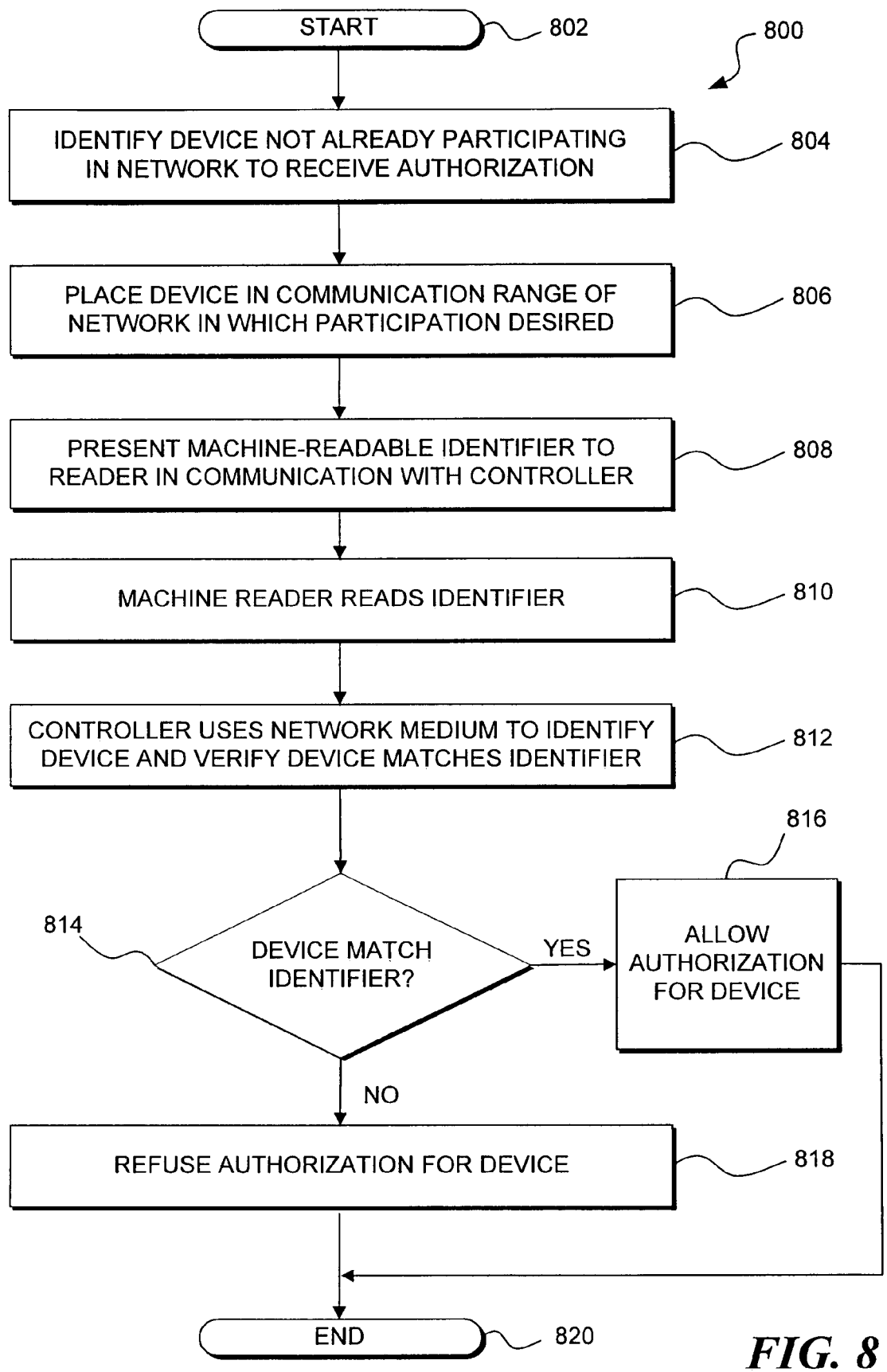
FIG. 8 is a flow diagram illustrating the logical steps for authorizing a device to participate in a wireless network where the device is associated with a machine-readable identifier presentable to a machine code reader associated with a controller.

FIG. 8 is a flow diagram 800 illustrating the logical steps for authorizing a device to participate in a network based on presentation of a valid machine-readable identifier. Flow diagram 800 begins at a step 802. At a step 804, a device that is not already participating in the communications network is identified to receive authorization. At a step 806, the device to be authorized is placed in communications range of the network. At a step 808, the machine-accessible network access information is presented to the machine code reader associated with the controller. As described above, the machine-accessible network access information may be secured to the device, secured to the packaging of the device, or included with materials provided with the device. Further, as also mentioned above, it is assumed that an individual having access to the machine code reader is authorized to allow devices to participate in the network.

At a step 810, the machine code reader reads the network access information. At a step 812, the controller uses the network medium, whether it be a wireless, a powerline, or a wired network, to identify the device and verify that the device matches the network access information presented to the reader. At a decision step 814, it is determined if the device matches the identifier. If so, at a step 816, authorization to participate in the network is permitted for the device, enabling the device to participate in a network. As described above, the authorization may be provisional in nature, creating a time window during which non-provisional authorization can be arranged for the device. Alternatively, the authorization granted according to this embodiment of the present invention may be non-provisional. Or, if it is determined at decision step 814 that the device does not match the network access information presented to the reader, at a step 818, authorization for the device to participate in the network is refused. In either case, flow diagram 800 ends at a step 820.

Logical Steps for Authorizing a Device Using an Authorization Database

Figure 9:
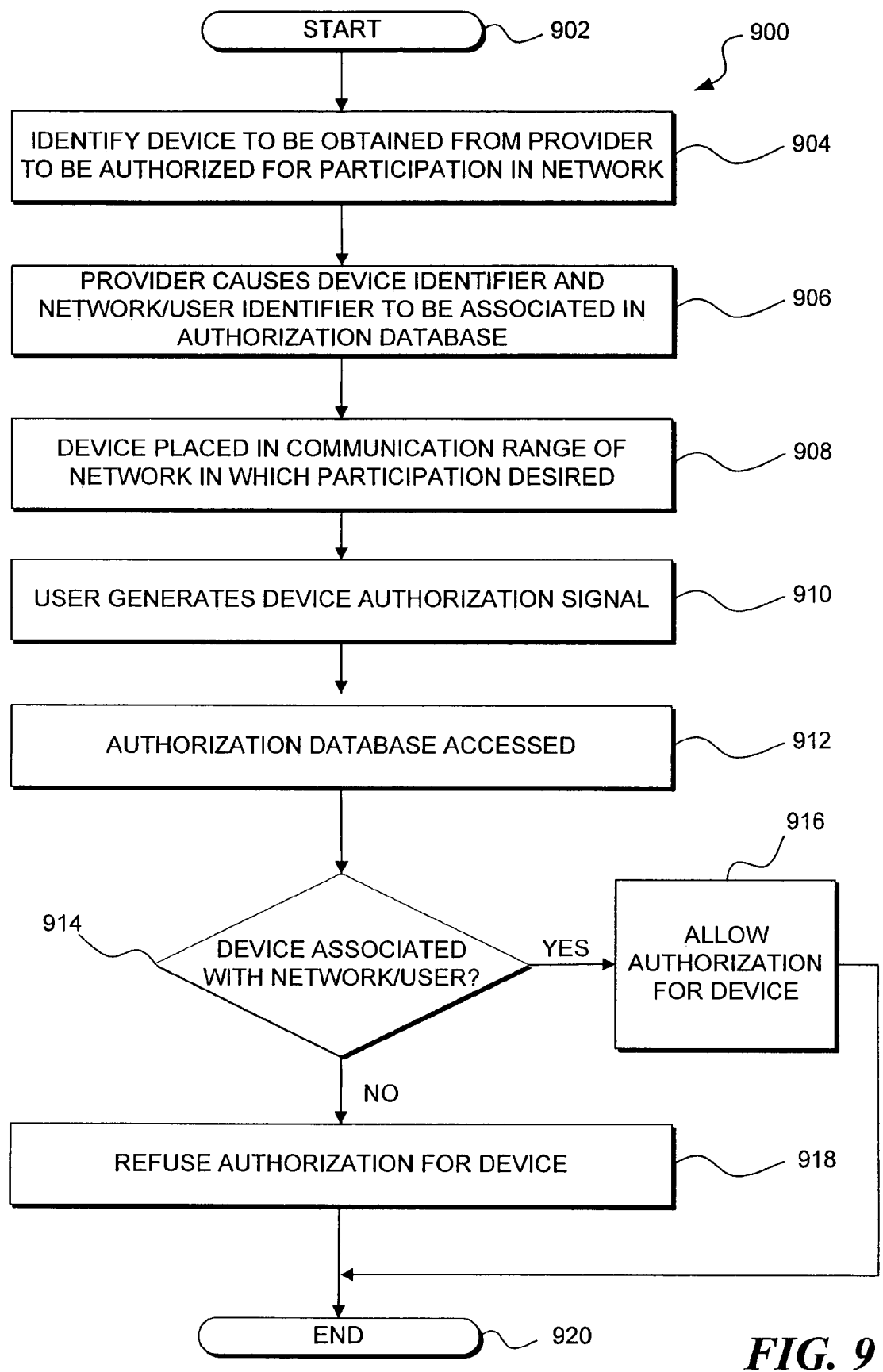
FIG. 9 is a flow diagram illustrating the logical steps for authorizing a device to participate in a wireless network where the device is pre-authorized in an authorization database accessible by a controller in the wireless network.

FIG. 9 is a flow diagram 900 illustrating the logical steps for authorizing a device to participate in a network based on the device being associated with a network or with a user who is permitted to access the network, based upon data in an authorization database. Flow diagram 900 begins with a step 902. At a step 904, a device that is not already participating in the communications network is identified as requesting to receive authorization. At a step 906, a device provider causes network access information and either a network or user identifier to be associated with the device and the network in an authorization database. As described above, network access information representing the device may be entered into the authorization database by a human attendant or by a computer program involved in the provision of the device to the user. In the case of the human attendant, the device identifier may be scanned by a machine or manually entered by the attendant; in either case, as was explained in the method described above in connection with FIGS. 5A through 5C and FIG. 8, the user does not manually enter the network access information. An identifier representing the network or a user who is authorized to use the network also may be scanned by a machine or manually entered by an attendant. Again, an identifier associated with the user may be a credit card number, a debit card number, a bank account number, a Social Security number, a driver's license number, an e-mail address associated with the user or any other suitable secure personal identifier. An identifier associated with the network may be an identifier associated with a controller or otherwise assigned to represent the network.

At a step 908, the device to be authorized is placed in communication range of the network (or coupled into communication with the network). At a step 910, a user generates a device authorization signal to initiate examination of the network access information and, thus, verification of the device. As described above, generation of the device authorization signal can be performed by pressing a switch on a network controller, sending a command from another device already authorized to use the network, resetting a controller on the network, or in another suitable manner. At a step 912, the authorization database is accessed. At a decision step 914, it is determined if the device has been associated with the network or with a user who is authorized to participate in the network. If so, at a step 916, authorization to participate in the network is granted the device, enabling the device to do so. As described above, the authorization may be provisional in time, creating a time window or interval during which non-provisional authorization can be arranged for the device. Alternatively, the authorization granted according to this embodiment of the present invention may be non-provisional. However, if it is determined at decision step 914 that the device does not match the network access information presented to the reader, at a step 918, authorization for the device to participate in the network is refused. In either case, flow diagram 900 ends at a step 920.

Logical Steps for Authorizing a Device with Machine-Accessible Network Access Information and an Authorization Database FIG. 10 is a flow diagram 1000 illustrating the logical steps for authorizing a device to participate in a network based on presentation of valid machine-accessible network access information and verification that the device is associated with a network or with a user who is permitted to access the network, by reference to data in an authorization database. Flow diagram 1000 begins at a step 1002. At a step 1004, a device that is not already participating in the communications network is identified as needing to receive authorization. At a step 1006, a device provider causes a network access information and either a network or user identifier to be associated with the device in an authorization database, as described above. At a step 1008, the device to be authorized is placed in communication range of the network (or coupled in communication with the network). At a step 1010, the machine-accessible network access information is presented to the machine code reader associated with the controller as described above. At a step 1012, the machine code reader reads the network access information. At a step 1014, the controller uses the network medium to identify the device and to verify that the device matches the network access information presented to the reader. At a decision step 1016, it is determined if the device matches the network access information. If not, at a step 1018, authorization for the device to participate in the network is refused, and the flow diagram ends at a step 1020.

On the other hand, if it is determined at decision step 1016 that the device matches the network access information presented to the machine code reader, at a step 1022, the authorization database is accessed. In contrast to flow diagram 900 (FIG. 9), a separate step to generate a device authorization signal may be omitted, because presentation of the machine-accessible network access information to the machine code reader is used to generate such a signal. At a decision step 1024, it is determined if the device has been associated with the network or with a user who is authorized to participate in the network. If not, at step 1018, authorization for the device to participate in the network is refused, and the flow diagram ends at step 1020. However, if it is determined at decision step 1024 that the device has been associated with the network or with a user who is authorized to participate in the network, at a step 1026, authorization for the device to participate in the network is granted, enabling the device to do so. As described above, the authorization may be provisional in nature, creating a time window during which non-provisional authorization can be arranged for the device. Alternatively, the authorization granted according to this embodiment of the present invention may be non-provisional. Flow diagram 1000 ends at step 1020.

Logical Steps for Granting Provisional and/or Non-Provisional Authorization

FIG. 11 is a flow diagram 1100 illustrating the logical steps for authorizing a device to participate provisionally in a network based on presentation of a valid machine-accessible network access identification and verification that the device is associated with a network or with a user who is permitted to access the network, as indicated in data maintained in an authorization database. Flow diagram 1100 begins at a step 1102. At a step 1104, a device that is not already participating in the communications network is identified to receive authorization. At a step 1106, the device to be authorized is placed in communications range of the network (or coupled with the network). At a step 1108, a network controller or other device seeks to verify that the device is associated with valid identification that would support allowance of provisional authorization. Verification of the device's identification may be undertaken by presentation of a machine-readable identifier and/or by accessing an authentication database, as described above in connection with FIGS. 8 through 10.

At a decision step 1110, it is determined if the device is associated with valid identification. If not, authorization for the device is refused at a step 1112, and flow diagram 1100 ends at a step 1114. On the other hand, if it is determined that valid identification is associated with the device and would warrant provisional authorization, at a step 1116, provisional authorization for the device to participate in the network is granted, enabling the device to communicate over the network medium with other network devices.

In one embodiment of the present invention, at a step 1118, an interval sufficient for securing non-provisional authorization for the device commences. At a decision step 1120, it is determined if non-provisional authorization has been secured by a user providing necessary information, by a system administrator authorizing non-provisional authorization, or by some other process. If so, at a step 1122, non-provisional authorization for the device to participate in the network is granted, and flow diagram 1100 ends at a step 1114. On the other hand, if it is determined that non-provisional authorization has not yet been granted, at a decision step 1124, it is determined if the interval granted for non-provisional authorization to be secured has expired. If not, flow diagram 1100 loops to decision step 1120 to determine if non-provisional authorization has been granted. Or, if it is determined at decision step 1124 that the interval has expired, at a step 1126, future provisional authorization for the device is disallowed. Such disallowance may be made by logging the device identifier in a disallowed device list maintained on a network controller, or by making a similar entry in the authorization database, or by another appropriate method. Optionally, if it is desired that the device be given another opportunity, the entry blocking future provisional authorization can be removed by a user with appropriate network security access and permissions. However, once future provisional authorization is disallowed at step 1126, authorization for the device is generally refused at step 1112, and flow diagram 1100 ends at step 1114.

In flow diagram 1100, the only basis for disallowance of authorization indicated is expiration of the interval permitted for securing non-provisional authorization. However, other reasons for disallowance of non-provisional authorization might also be included. For example, failure to determine that the identifier is authorized to participate in the secure network could result in refusal of non-provisional authorization. Also, a network administrator could flag a device as being ineligible for authorization, if it is determined that the device was stolen or that some other undesired condition related to the device exists. Further, establishment of non provisional authorization enabling the device to participate in the secure network may result in a future refusal of provisional access being permitted if, for some reason, non-provisional authorization should be lost or revoked.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for authorizing a first device to participate in a secure network, the first device having been newly acquired by a user from a provider facility including at least one of an e-commerce organization, a direct sales company, or a mail order warehouse, wherein at the provider facility, provider network access information for the first device and a user identifier for the user are provided to an authentication database the method comprising the steps of:
    (a) receiving network access information for a first device including receiving the network access information at a secure router in the secure network, the network access information being encoded in an optically scanable linear or two dimensional barcode, and wherein the network access information comprises one or more of a media access control address, a security mode, or a security key, and wherein receiving network access information for the first device comprises reading the optically scanable linear or two dimensional barcode using a barcode scanner that is integral to the router or that is a detachable peripheral device receivable by the router, such that a user must be in close proximity to the router to use the barcode scanner;
    (b) based on the received network access information, identifying the first device on the secure network;
    (c) verifying that the first device matches the network access information by verifying the network access information against the provider network access information at the authentication database;
    (d) verifying that the first device is associated with the user by verifying the user identifier at the authentication database; and
    (e) as a result of identifying that the first device matches the network access information, verifying that the first device matches the network access information; and verifying that the first device is associated with the user, allowing the first device to provisionally participate in the secure network for a predetermined amount of time during which a user may arrange non-provisional authorization for the first device to access the secure network.

2. The method of claim 1, further comprising the step of determining that the authorization should not be granted by the second device, based on one or more of:
    (a) an expiration of a provisional authorization interval granted to enable the first device to provisionally participate in the secure network;
    (b) a determination that the network access information is not a basis for authorizing the first device to participate in the secure network; or
    (c) a revocation of the provisional authorization by a network administrator.

3. The method of claim 1, wherein the secure network comprises at least one of:
    (a) an IEEE 802.11 wireless network, so that the first device is disposed so that it will be able to participate in the IEEE 802.11 network when the first device is within a communication range of a wireless device participating as the second device in the IEEE 802.11 network;
    (b) a Bluetooth network, such that the first device is disposed so that it will be able to participate in the secure network when the first device is within a communications range of a Bluetooth device participating as the second device in the secure network;
    (c) a wireless network, so that the first device is disposed so that it will be able to participate in the secure network when the first device is within a communication range of a wireless device participating as the second device in the secure network;
    (d) a powerline network, such that the first device is disposed so that it will be able to participate in the secure network when the first device is coupled with electrical power wiring to which a powerline controller participating as the second device is also coupled;

(e) a telephone wiring network, such that the first device is disposed so that it will be able to participate in the secure network when the first device is operably coupled with telephone wiring to which the second device is also operably coupled, whereby the first device is configured to communicate with the second device over the telephone wiring while the telephone wiring conveys regular telephone communications;

(f) a coaxial wiring network, such that the first device is disposed so that it will be able to participate in the secure network when the first device is operably coupled with coaxial wiring to which the second device is also operably coupled, whereby the first device is configured to communicate with the second device over the coaxial wiring while the coaxial wiring conveys one of regular television and regular wide area network communications; or (g) a wired network, such that the first device is disposed so that it will be able to participate in the secure network when the first device is coupled to the second device via a network cable.

4. The method of claim 1, wherein the user identifier includes at least one of:
  (a) a credit card number of the user;
  (b) a debit card number of the user;
  (c) a bank account number of the user;
  (d) a Social Security number of the user;
  (e) an e-mail address of the user; or
  (f) a driver's license number of the user.

5. A method for authorizing a device to provisionally participate in a secure network, the device having been newly acquired by a user from a provider facility including at least one of an e-commerce organization, a direct sales company, or a mail order warehouse, wherein at the provider facility, provider network access information for the device and a user identifier for the user are provided to an authentication database, the method comprising the steps of:
  (a) receiving network access information for a first device including receiving the network access information at a secure router in the secure network, the network access information being encoded in a radio frequency identification tag, and wherein the network access information comprises one or more of a media access control address, a security mode, or a security key, and wherein receiving network access information for the first device comprises reading the radio frequency identification tag using a radio frequency identification tag reader that is integral to the router or that is a detachable peripheral device receivable by the router, such that a user must be in close proximity to the router to use the radio frequency identification tag reader;
  (b) based on the received network access information, identifying the first device on the secure network;
  (c) verifying that the first device matches the network access information by verifying the network access information against the provider network access information at the authentication database;
  (d) verifying that the first device is associated with the user by verifying the user identifier at the authentication database; and
  (e) as a result of identifying that the first device matches the network access information, verifying that the first device matches the network access information, and verifying that the first device is associated with the user, allowing the first device to provisionally participate in the secure network for a predetermined amount of time during which a user may arrange non-provisional authorization for the first device to access the secure network.

6. The method of claim 5, further comprising the step of disallowing provisional participation by the device in the secure network upon detecting at least one of:
  (a) an expiration of a provisional authorization interval previously granted to enable the device to provisionally participate in the secure network;
  (b) a determination that the network access information does not provide a basis for authorizing the device to participate in the secure network;
  (c) a revocation of provisional authorization for the device by a network administrator; or
  (d) establishment of a non-provisional authorization for the device to participate in the secure network.

7. The method of claim 5, further comprising entering an authorization in an authorization database that comprises:
  (a) the network identifier associated with the secure network; and
  (b) the user identifier associated with a user authorized to access the secure network.

8. The method of claim 7, wherein the user identifier includes at least one of: (a) a credit card number of the user;
  (b) a debit card number of the user;
  (c) a bank account number of the user;
  (d) a Social Security number of the user;
  (e) an e-mail address of the user; or
  (f) a driver's license number of the user.

9. A control system for controlling participation of a device in a secure network, the device having been newly acquired by a user from a provider facility including at least one of an e-commerce organization, a direct sales company, or a mail order warehouse, wherein at the provider facility, provider network access information for the device and a user identifier for the user are provided to an authentication database, comprising:
  (a) a processor;
  (b) a communication interface coupled in communication with the processor and configured to exchange information with at least one computing device; and
  (c) a memory in communication with the processor, the memory storing data and machine instructions that cause the processor to carry out a plurality of functions, including:
    (i) receiving network access information for a first device including receiving the network access information at a secure router in the secure network, the network access information being encoded in an optically scanable linear or two dimensional barcode, and wherein the network access information comprises one or more of a media access control address, a security mode, or a security key, and wherein receiving network access information for the first device comprises reading the optically scanable linear or two dimensional barcode using a barcode scanner that is integral to the router or that is a detachable peripheral device receivable by the router, such that a user must be in close proximity to the router to use the barcode scanner;
    (ii) based on the received network access information, identifying the first device on the secure network;
    (iii) verifying that the first device matches the network access information by verifying the network access information against the provider network access information at the authentication database;

(iv) verifying that the first device is associated with the user by verifying the user identifier at the authentication database; and (iv) as a result of identifying that the first device matches the network access information, verifying that the first device matches the network access information, and verifying that the first device is associated with the user, allowing the first device to provisionally participate in the secure network for a predetermined amount of time during which a user may arrange non-provisional authorization for the first device to access the secure network.

10. The control system of claim 9, wherein the secure network includes at least one of:

(a) an IEEE 802.11 wireless network, so that the first device IS disposed so that it will be able to participate in the IEEE 802.11 network when the first device is within a communication range of a wireless device participating as the second device in the IEEE 802.11 network;

(b) a Bluetooth network, such that the first device is disposed so that it will be able to participate in the secure network when the first device is within a communications range of a Bluetooth device participating as the second device in: the secure network;

(c) a wireless network, so that the first device is disposed so that it will be able to participate in the secure network when the first device is within a communication range of a wireless device participating as the second device in the secure network;

(d) a powerline network, such that the first device is disposed so that it will be able to participate in the secure network when the first device is coupled with electrical power wiring to which a powerline controller participating as the second device is also coupled;

(e) a telephone wiring network, such that the first device is disposed so that it will be able to participate in the secure network when the first device is operably coupled with telephone wiring to which the second device is also operably coupled whereby the first device is configured to communicate with the second device over the telephone wiring while the telephone wiring conveys regular telephone communications;

(f) a coaxial wiring network, such that the first device is disposed so that it will be able to participate in the secure network when the first device is operably coupled with coaxial wiring to which the second device is also operably coupled, whereby the first device is configured to communicate with the second device over the coaxial wiring while the coaxial wiring conveys one of regular television and regular wide area network communications; or (g) a wired network, such that the first device is disposed so that it will be able to participate in the secure network when the first device is coupled to the second device via a network cable.

11. The control system of claim 9, further comprising an authorization database accessible by the processor over a communication link that includes data related to the authorization of the device, the processor authorizing the device to participate in the secure network upon accessing the data to verify that the network access information is associated in the authorization database with (a) a network identifier associated with the secure network; and (b) a user identifier associated with a user authorized to access the secure network.

12. The method of claim 1, wherein the barcode including the network access information is attached to packaging in which the first device was purchased.

13. The method of claim 1, wherein the barcode including the network access information is included with documentation for the first device.

14. The method of claim 5, wherein the radio frequency identification tag including the network access information is attached to packaging in which the first device was purchased.

15. The method of claim 5, wherein the radio frequency identification tag including the network access information is included with documentation for the first device.

* * * * *